(12) United States Patent
Ware et al.

(10) Patent No.: US 9,465,961 B2
(45) Date of Patent: Oct. 11, 2016

(54) METHODS AND CIRCUITS FOR SECURING PROPRIETARY MEMORY TRANSACTIONS

(71) Applicant: Rambus Inc., Sunnyvale, CA (US)

(72) Inventors: Frederick A. Ware, Los Altos Hills, CA (US); Brian S. Leibowitz, San Francisco, CA (US); Pradeep Batra, Santa Clara, CA (US); Trung Am Diep, San Jose, CA (US)

(73) Assignee: Rambus Inc., Sunnyvale, CA (US)

( * ) Notice: Subject to any disclaimer, the term of this patent is extended or adjusted under 35 U.S.C. 154(b) by 190 days.

(21) Appl. No.: 14/098,628

(22) Filed: Dec. 6, 2013

(65) Prior Publication Data

US 2014/0173238 A1    Jun. 19, 2014

Related U.S. Application Data

(60) Provisional application No. 61/738,698, filed on Dec. 18, 2012.

(51) Int. Cl.

| | | |
|---|---|---|
| *G06F 12/14* | (2006.01) | |
| *G06F 21/85* | (2013.01) | |
| *G06F 21/78* | (2013.01) | |
| *G09C 1/00* | (2006.01) | |
| *H04L 9/06* | (2006.01) | |
| *H04L 9/12* | (2006.01) | |

(52) U.S. Cl.
CPC .............. *G06F 21/85* (2013.01); *G06F 21/78* (2013.01); *G09C 1/00* (2013.01); *H04L 9/065* (2013.01); *H04L 9/12* (2013.01); *G06F 2221/2107* (2013.01); *H04L 2209/12* (2013.01); *H04L 2209/56* (2013.01)

(58) Field of Classification Search
CPC .... G06F 12/1408; G06F 21/78; G06F 21/85; G06F 2221/2107
USPC ............................................... 711/163
See application file for complete search history.

(56) References Cited

U.S. PATENT DOCUMENTS

| | | | |
|---|---|---|---|
| 5,847,981 A | 12/1998 | Kelley et al. | |
| 7,284,135 B2 | 10/2007 | Evans et al. | |
| 7,373,668 B1 | 5/2008 | Trimberger | |
| 2002/0101996 A1* | 8/2002 | Takada | H04L 9/065 380/277 |
| 2004/0090827 A1* | 5/2004 | Dahlen | G06F 11/2061 365/200 |

(Continued)

OTHER PUBLICATIONS

"Linear Feedback Shift Register," Wikipedia, Source: http://en.wikipedia.org/w/index.php?oldid=500429122, Received Mar. 5, 2014. 9 pages.

(Continued)

*Primary Examiner* — Yong Choe
(74) *Attorney, Agent, or Firm* — Silicon Edge Law Group LLP; Arthur J. Behiel

(57) ABSTRACT

Described are systems and method for protecting data and instructions shared over a memory bus and stored in memory. Independent and separately timed stream ciphers for write and read channels allow timing variations between write and read transactions. Data and instructions can be separately encrypted prior to channel encryption to further secure the information. pad generators and related cryptographic circuits are shared for read and write data, and to secure addresses. The cryptographic circuits can support variable data widths, and in some embodiments memory devices incorporate security circuitry that can implement a shared-key algorithm using repurposed memory circuitry.

7 Claims, 22 Drawing Sheets

(56) References Cited

U.S. PATENT DOCUMENTS

| | | | |
|---|---|---|---|
| 2007/0067644 A1 | 3/2007 | Flynn et al. | |
| 2007/0101434 A1 | 5/2007 | Jevans | |
| 2007/0294531 A1* | 12/2007 | Alten | G06F 7/582 713/168 |
| 2008/0162947 A1 | 7/2008 | Holtzman et al. | |
| 2010/0082911 A1* | 4/2010 | Das | G11C 7/02 711/154 |
| 2010/0310076 A1 | 12/2010 | Barzilai et al. | |
| 2010/0322411 A1* | 12/2010 | Lubberhuizen | H04L 9/0631 380/28 |
| 2012/0008772 A1* | 1/2012 | Sugahara | G06F 21/79 380/46 |
| 2012/0191984 A1* | 7/2012 | Ohyama | H04L 9/0637 713/189 |

OTHER PUBLICATIONS

"Multiply—Accumulate Operation," Wikipedia Article, Source: http://en.wikipedia.org/w/index.php?oldid=504807757, Received Mar. 5, 2014. 3 pages.

"Public-Key Cryptography," Wikipedia, Source: http://en.wikipedia.org/w/index.php?oldid=510017539, Received Mar. 5, 2014. 11 pages.

"Reverse Engineering," Wikipedia, Source: http://en.wikipedia.org/w/index.php?oldid=501283497, Received Mar. 5, 2014. 9 pages.

"Trivium (Cipher)," Wikipedia, Source: http://en.wikipedia.org/w/index.php?oldid=484313678, Received Mar. 5, 2014. 4 pages.

Bailey et al., "Cryptography in Modern Communication Systems," Presented at Texas Instruments DSPS FEST, Houston, TX, Aug. 1999. 15 pages.

Crenne et al., "Configurable Memory Security in Embedded Systems," ACM Transactions on Embedded Computing Systems, vol. V, No. N, Sep. 2011. 26 pages.

Goodin, Dan, "Ex-Army Man Cracks Popular Security Chip: How to Open Infineon's Trusted Platform Module," Security, Feb. 17, 2010, retrieved from the Register online at http://www.theregister.co.uk/2010/02/17/infineon_tpm_crack/. 3 pages.

Neuhauser et al., "Reduced Redundant Arithmetic Applied on Low Power Multiply-Accumulate Units," EHAC'12/ISPRA/Nanotechnology'12, World Scientific and Engineering Academy and Society, Stevens Point, Wisconsin, 2012, pp. 204-209. 6 pages.

STMicroelectronics, "AN1823 Application Note: Error Correction Code in NAND Flash Memories," May 2004. 14 pages.

* cited by examiner

| # links (W) | N | WSel | Cnt |
|---|---|---|---|
| 4 | 16 | 0 | 1 |
| 8 | 8 | 1 | 2 |
| 16 | 4 | 2 | 4 |
| 32 | 2 | 3 | 8 |

METHODS AND CIRCUITS FOR SECURING PROPRIETARY MEMORY TRANSACTIONS

FIELD

The subject matter disclosed herein relates generally to the field of computer memory.

BACKGROUND

Computers generally include a processing unit (PU) that reads instructions and data from a memory, and that executes the instructions with reference to the data to obtain some result. Myriad applications are available for execution on personal computers, gaming machines, set-top boxes, and handheld devices, for example. Computer systems are also embedded into an ever increasing share of consumer and military hardware.

Computers and the applications that run on them are complex, and their development is both time-consuming and expensive. Entities who develop such hardware and software understandably want to enjoy the fruits of their efforts and investments. The same is true for entities that collect and maintain proprietary data that may be stored in memory.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
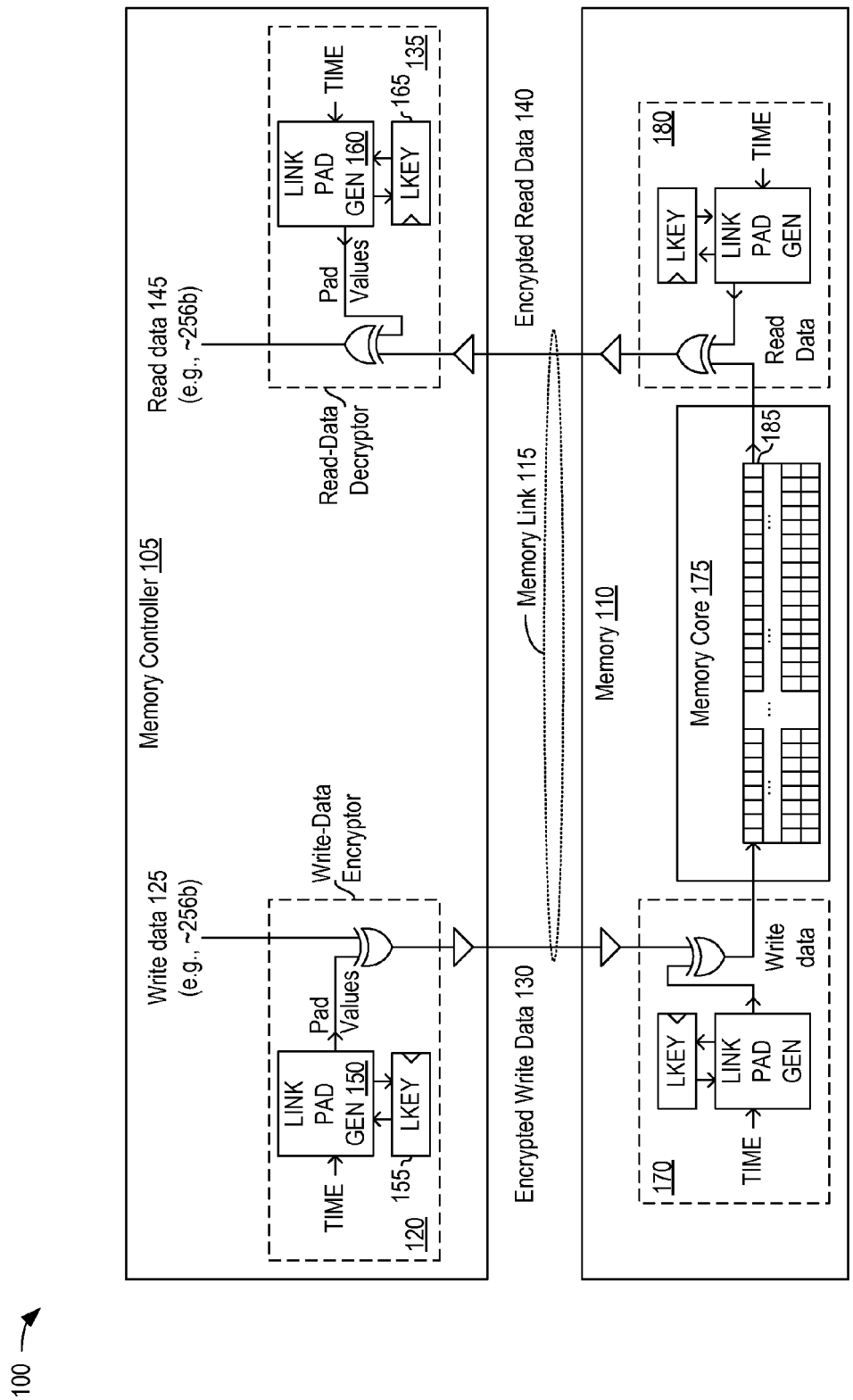
FIG. 1 is a computer system 100 that protects data and instructions shared between a memory controller 105 and a memory 110 via a memory link 115 using separate stream ciphers (or cyphers) for write and read channels.

FIG. 1 is a computer system 100 that protects data and instructions shared between a memory controller 105 and a memory 110 via a memory link 115 using separate stream ciphers (or cyphers) for write and read channels. Memory controller 105 is instantiated on an integrated-circuit (IC) device that can include a processing unit, such as a central processing unit (CPU), or can support a separate CPU (not shown). Controller 105 includes a write-data encryptor 120 to encrypt write data 125 from the processor and communicate the resultant encrypted write data 130 to memory 110. Controller 105 additionally includes a read-data decryptor 135 to decrypt encrypted data 140 from memory 110, and thus recover decrypted read data 145. The encrypted information passing between controller 105 and memory 110 is referred to as write and read "data" in this example, but commonly includes, e.g., instructions and memory addresses too. Link 115 is shown as two unidirectional signal paths, but can be bidirectional in other embodiments.

Write-data encryptor 120 includes a link-pad generator 150 that generates a sequence of pad values from an initialization key stored in a link-key register 155. Generator 150 advances to a next pad value based on some signal that changes with time, and can be monitored on both controller 105 and memory 110. Suitable signals include one or a combination of a common clock, addresses specified for memory accesses, and process identifiers that are unique to each process that makes a memory request. Changing the pad value at regular or irregular intervals (e.g., every memory transaction or for different processes) increases the difficulty of breaking the cipher because repeated accesses to the same memory address are encrypted using different pad values. In this example each unit of write data 125 (256 bits in this example) is combined with a corresponding pad value using a non-diffusive function to produce encrypted data 130. The non-diffusive function is an exclusive OR in this case, which can be performed using relatively power- and area-efficient circuitry.

Read-data decryptor 135 includes a link-pad generator 160 that generates a sequence of pad values from an initialization key stored in a link-key register 165. The initialization key and sequence of pad values are the same as employed by encryptor 120 in this embodiment, but this need not be so. As detailed below, decryptor 145 and encryptor 120 can use many of the same resources for area and power efficiency.

Memory 110 includes a write-data decryptor 170 to decrypt write data 130 for storage in a memory core 175. The stored data is identical to data 125, the pre-encryption information in controller 105. Memory 110 also includes a read-data encryptor 180 to secure read data from memory core 175, producing encrypted data 140. Decryptor 170 and encryptor 180 are the same or similar to decryptor 135 and encryptor 120, so a detailed discussion is omitted.

The two encryptor/decryptor pairs 120/170 and 180/135 support separately protected write and read channels. This separation allows controller 105 to encrypt a unit of write data directed to a specified address 185, here depicted as a row of memory locations, using a different pad value than is later used to read the same unit from the specified address. The time lapse between a write to any given address and the subsequent read or reads of that information varies depending upon the needs of the controller. Separating the write and read protection into separately timed, secure channels allows the encryption/decryption processes to update pad values with time without the overhead that would otherwise be required to synchronize the security processes used to write and read to each address.

Read-data decryptor 135 includes a link-pad generator 160 that generates a sequence of pad values from an initialization key stored in a link-key register 165. The initialization key and sequence of pad values are the same as employed by encryptor 120 in this embodiment. As detailed below, decryptor 135 and encryptor 120 can use many of the same resources for area and power efficiency.

In cryptography, write data 125 and encrypted write data 130 are "plaintext" and "ciphertext," respectively. Encryptors 120 and 180 perform stream ciphers, in which the bits of each 256-bit unit of write data 125 are combined with a 256-bit binary number referred to herein as a pad value. Each link pad generator issues pad values as a deterministic, pseudorandom sequence, the initial value of which is determined by a "seed" value in key register 155.

Encryptor 120 on controller 105 and decryptor 170 on memory 110 share the same seed value and thereafter remain in lock-step for generating each successive pad value. The same is true of encryptor 180 and decryptor 135, though the seed value may be different for the read pair than for the write pair. Key sharing between controller 105 and memory 110 is accomplished securely using conventional circuits and techniques that are well known to those of skill in the art. Some embodiments facilitate secure key sharing using circuits especially adapted for use in memory systems, as detailed in connection with later examples.

Figure 2:
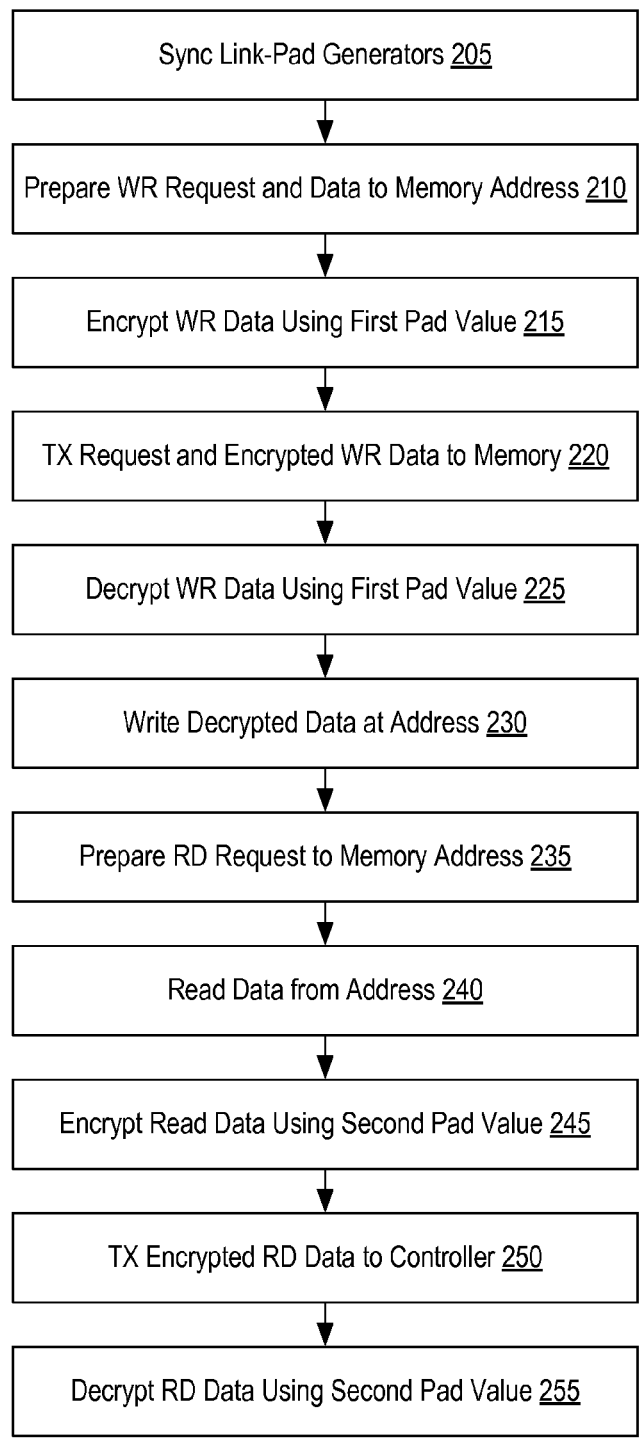
FIG. 2 is a flowchart 200 outlining the operation of an embodiment of memory system 100 of FIG. 1.

FIG. 2 is a flowchart 200 outlining the operation of an embodiment of memory system 100 of FIG. 1. To begin with, at step 205, the seed value for the two encryptor/decryptor pairs 120/170 and 180/135 are loaded into the link-key registers (e.g., 155 and 165). The seed values are the same for both ends of the write channel, and for both ends of the read channel, and may be the same for both write and read channels. In some embodiments memory 110 includes non-volatile memory that stores private and public keys that allow memory controller 105 to encrypt a seed value, using the public key, and pass the resulting value to memory 110. Cryptographic circuitry on memory 110, examples of which are detailed below, use the stored private key and the encrypted seed value to recover each seed value and store it in the appropriate link-key register. The shared seed values synchronize the link-pad generators on either side of memory link 115.

With the link-pad generators synchronized, memory controller 105 can issue encrypted memory requests to memory 110. Assuming memory controller 105 receives a write request from a CPU, for example, memory controller 105 prepares a write request that includes the requisite memory address and a 256-bit unit of write data 125 (210). Encryptor 120 encrypts the unit of write data 125 using a first pad value from the link-pad generator 150 (215), and controller 105 transmits the request with the encrypted write data to memory 110 (220).

Decryptor 170 was initially seeded with the same key as encryptor 120, and sequences through the same sequence of pad values. Decryptor 170 therefore has access to the first pad value employed by encryptor 120 in step 215, and uses the first pad value to decrypt the incoming unit of data (225). Memory 110 writes the resultant plaintext into a memory core 175 at the specified address (230). The plaintext is thereafter available in memory core 175 until it is erased or overwritten.

Memory controller 105 reads the plain text from memory core 175 by first issuing a read request to the appropriate memory address (235). Memory 110 responds by reading the plaintext from core 175 and providing it to encryptor 180 (240). The read transaction takes place after the write transaction, and so the time signal TIME will have advanced all the link pad generators since the information was initially stored at the designated address in core 175. As a result, the unit of data read from the specified address will be encrypted using a second pad value different from the first (245). Memory 110 thus transmits the data to controller 105 (250) as different ciphertext than was conveyed to the memory 110 to store the same unit of data. Finally, decryptor 135 decrypts the ciphertext to recover a unit of data 145 (255).

Figure 3:
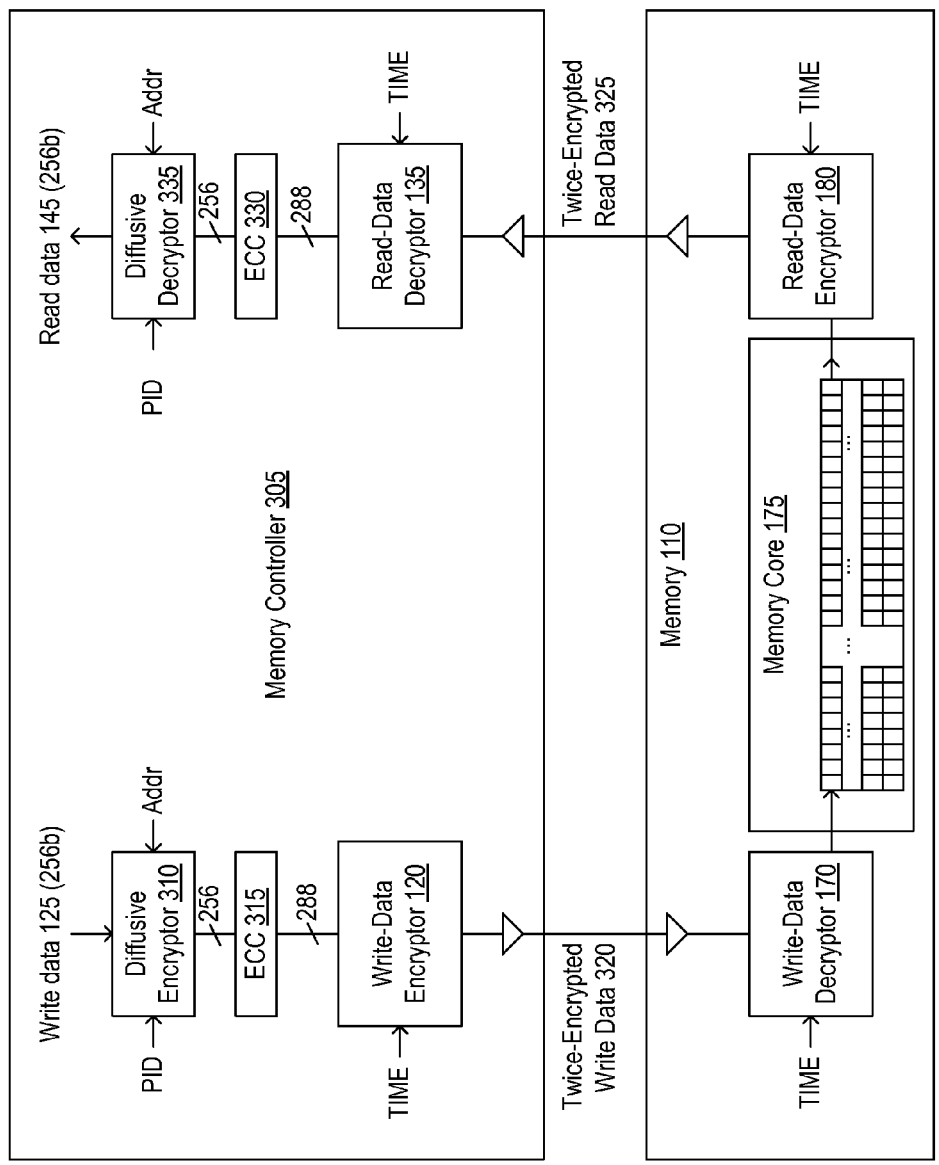
FIG. 3 depicts a memory system 300 that includes memory 110 of FIG. 1 and a memory controller 305 in accordance with another embodiment.

FIG. 3 depicts a memory system 300 that includes memory 110 of FIG. 1 and a memory controller 305 in accordance with another embodiment. System 300 is similar to system 100 of FIG. 1, with like-identified elements being the same or similar. System 300 offers additional data security, however, by encrypting write data 125 before applying the stream cipher used to secure the write channel. In essence, write data 125 is encrypted twice so that the information decrypted by write-data decryptor 170 is stored as ciphertext.

Memory controller 305 includes an encryptor 310 and error-correction circuit (ECC) encoder 315 that precede write-data encryptor 120. Encryptor 310 performs diffusive encryption on write data 125 in this example, and is seeded by the address Addr and process identifier PID associated with each specified write request. The resultant pre-encrypted units of write data are feed through ECC 315 to encryptor 120 for a second encryption. The twice-encrypted, error-correction coded unit of write data is then conveyed to memory 110. Decryptor 170 unwraps the channel encryption of encryptor 120 and conveys the resultant diffusively encrypted and error-correction coded ciphertext to core 175 as detailed above in connection with FIGS. 1 and 2. For a read transaction, encryptor 180 encrypts the ciphertext from a selected address and conveys the resultant twice-encrypted read data 325 to controller 305. Decryptor 135 unwraps the channel encryption of encryptor 180, ECC decoder 330 corrects any error, and a diffusive decryptor 335 recovers plaintext read data 145 from the error-corrected data.

The diffusive encryption provided by encryptor 310 and reversed by decryptor 335 can be a block cipher, an example of which is the Advanced Encryption Standard (AES). AES is widely known, and circuits for implementing AES are well known to those of skill in the art. A detailed description of the workings of encryptor 310 is therefore omitted. The error-correction circuitry of ECC 315 and 330 corrects for a single bit error and detects a double bit error in this embodiment. ECC 315 applies correction encoding between the diffusive and non-diffusive encryptions, and ECC 330 applies correction decoding between the non-diffusive and diffusive decryptions. Error-correction codes and circuits for enabling them are also well known.

Figure 4A:
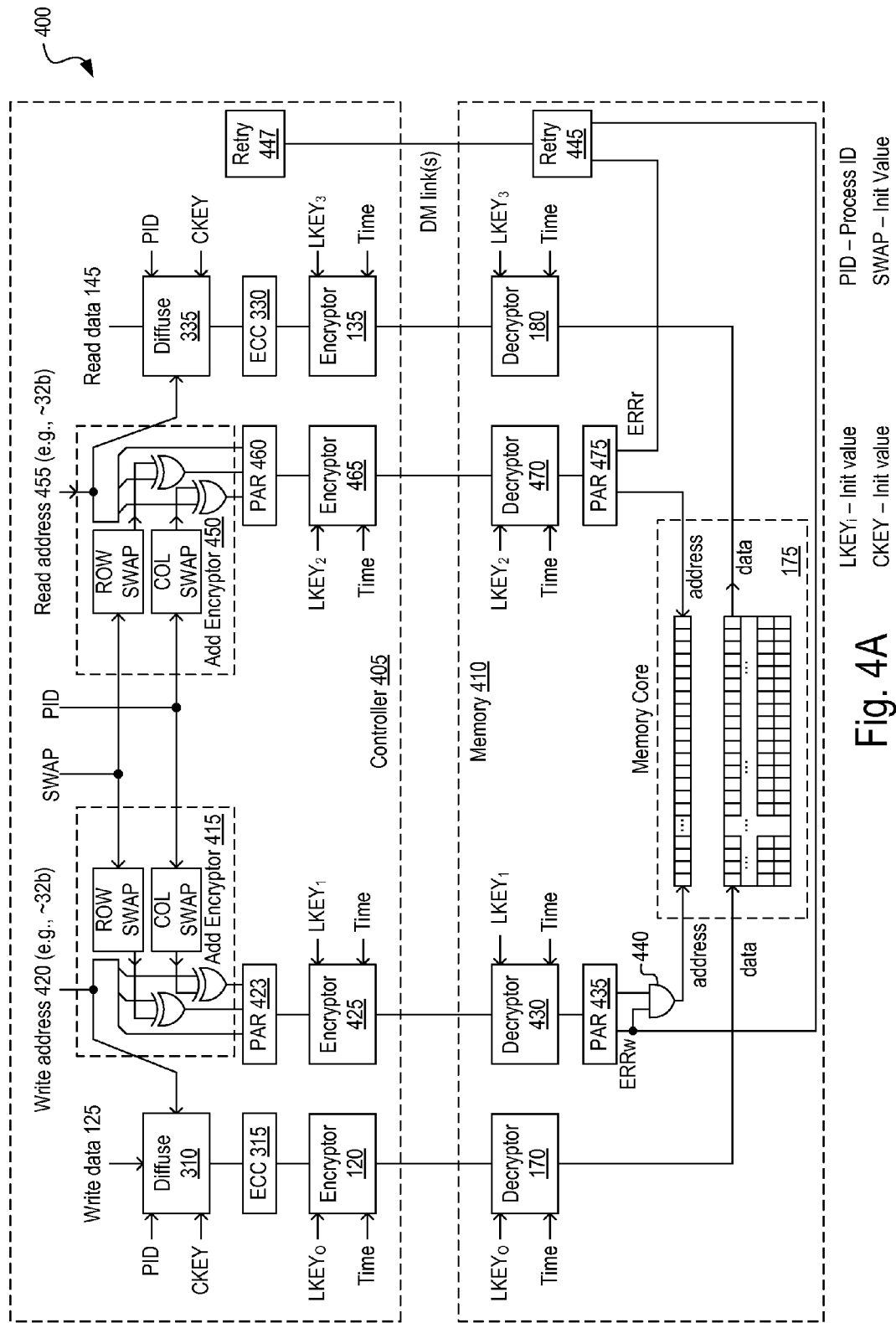
FIG. 4A depicts a memory system 400 in accordance with yet another embodiment.

FIG. 4A depicts a memory system 400 in accordance with yet another embodiment. System 400 is similar to systems 100 and 300, with like-identified elements being the same or similar. System 400 affords still greater security, however, by encrypting write and read addresses along with the associated data.

The path for securing write addresses extends from controller 405 to memory 410. On the controller side, a first write-address encryptor 415 encrypts each write address 420 associated with a write transaction, a parity circuit 423 sets a parity bit based on the encrypted write address, and a second write-address encryptor 425 encrypts the address once again, along with the parity bit, for transmission to memory 410. On the memory side, a write-address decryptor 430 decrypts the incoming twice-encrypted address, a parity check circuit 435 checks the parity bit and parity of the received command for errors, and an AND gate 440 to memory core 175 either admits or blocks write access depending upon whether check circuit 435 asserts an error signal ERRw. In the event an error is detected, signal ERRw induces a retry-circuit 445 to issue a retry signal to corresponding circuitry 447 on controller 405 to induce controller 405 to attempt try the write transaction again. In this example the retry circuits 445 and 447 save valuable resources by communicating via data-mask (DM) pins and lines that are also used to communicate mask signals from the controller to the memory.

Address encryptor 415 includes row- and column-swap circuitry that produce deterministic sequences of 32b pad values to XOR with the incoming addresses. Parity circuit 423 adds a parity bit to each encrypted address and sends the resultant bits to encryptor 425. Encryptor 425 encrypts those bits again and conveys the twice-encrypted address information to memory 410. Decryptor 430 decrypts the encrypted write address and parity-check circuit 435 checks for parity errors as noted above. The encryption applied by encryptor 415 remains in the address provided to core 175, but does not interfere with subsequent reads because the respective read addresses are treated to the same encryption. Encryptor 425 and decryptor 430 receive fewer bits than encryptor 120 and decryptor 170 in this example, but can be implemented using similar circuits.

The path for securing read addresses is functionally similar to the write-address path. A first read-address encryptor 450 encrypts each address 455 associated with a read transaction, a parity circuit 460 sets a parity bit based on the encrypted read address, and a second read-address encryptor 465 encrypts the address once again, along with the parity bit, for transmission to memory 410. A read-address decryptor 470 decrypts the incoming twice-encrypted address, and a parity check circuit 475 checks the parity bit for errors. In the event an error is detected, an error signal ERRr induces retry-circuit 445 to issue a retry signal to controller 405. Each memory address is conveyed as part of a memory command (e.g., a write command or a read command) in these examples, so encryptors 415 and 450 may also be referred to as "command encryptors." Bits other than address bits may also be encrypted in other embodiments.

Diffuse encryptor 310 and decryptor 335 are both seeded with the same initial key CKEY. Link keys $LKEY_0$, $LKEY_1$, $LKEY_2$, and $LKEY_3$ each serve a corresponding pair of security circuits on either side of system 400. Fewer keys can be used for read and write addresses and data. For example, a single 256-bit key can be used for read and write data, and a 32-bit subset of that data key can be used for addresses.

Figure 4B:
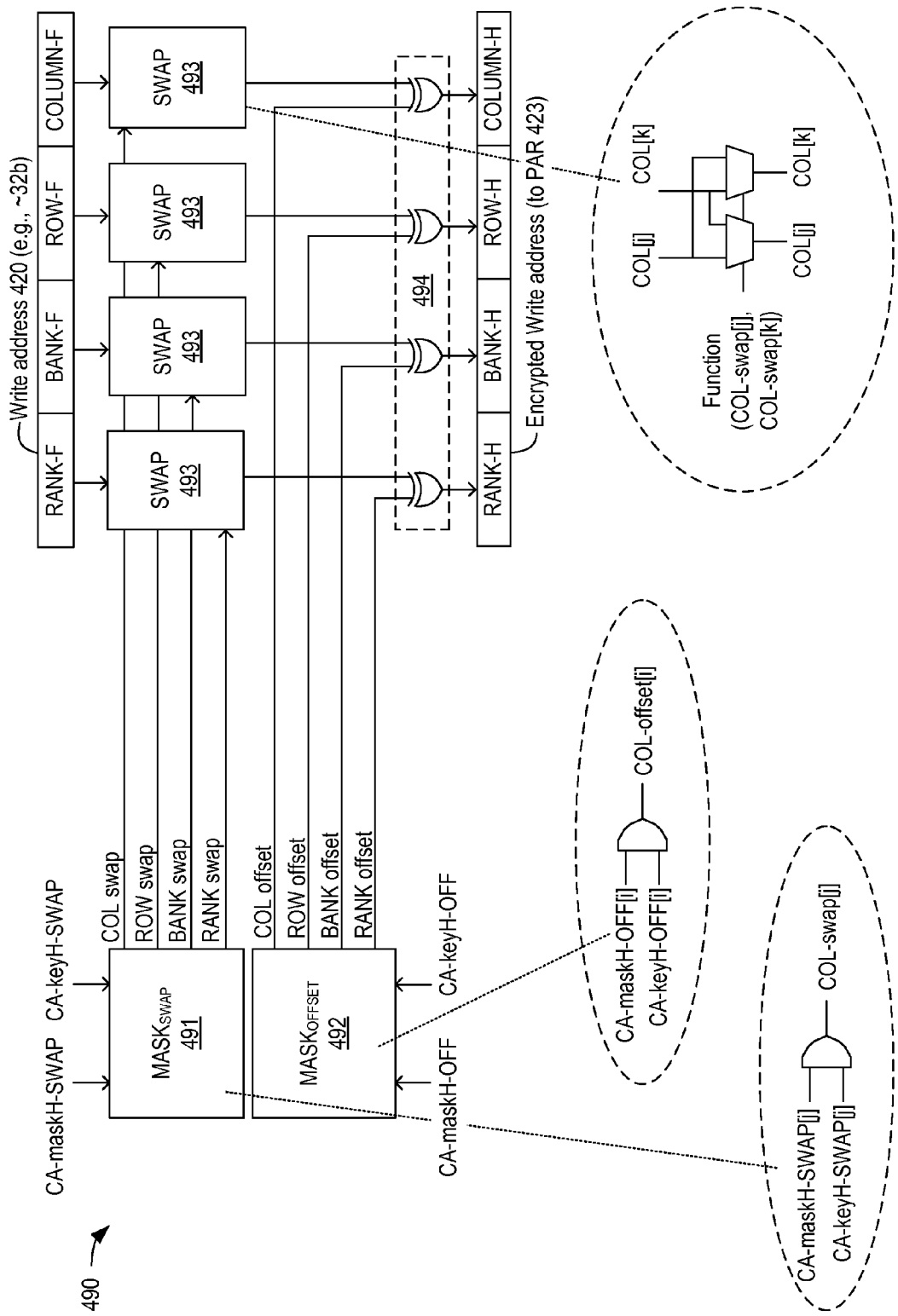
FIG. 4B depicts an address encryptor 490 that can be used for e.g. encryptors 415 and 450 of FIG. 4A.

FIG. 4B depicts an address encryptor 490 that can be used for e.g. encryptors 415 and 450 of FIG. 4A. Encryptor 490 encrypts a write address 420 by swapping selected rank, bank, row, and column bits. In this example, this swapping is accomplished by exchanging the bit positions of pairs of bits in one or more fields Rank-F, Bank-F, Row-F, and Column-F. Further, a static offset value may be exclusive-ored (XORed) with the swapped address bits. Both the swap and offset operations can be revered an arbitrary time after the encryption. Masks CA-maskH-SWAP and CA-maskH-OFF can be applied to exclude certain address bits from the swap and offset operations.

Encryptor 490 includes mask-swap logic 491, mask-offset logic 492, swap logic 493 for each address field, and a series of XOR gate 494. Mask-swap logic 491 performs an AND function of each mask bit with a corresponding bit of a key CA-keyH-SWAP to produce control signals COLswap, ROWswap, BANKswap, and RANKswap. Assuming a corresponding asserted mask bit, each logic-one key bit asserts a swap bit that swaps a bit pair within one set of swap logic 493. The key CA-keyH-SWAP can be fixed or time variant, but in the latter case is selected from a value that can be replicated when the same address is later read. The key can be a function of the process ID (PID) for the process requesting the read operation, for example.

Figure 5:
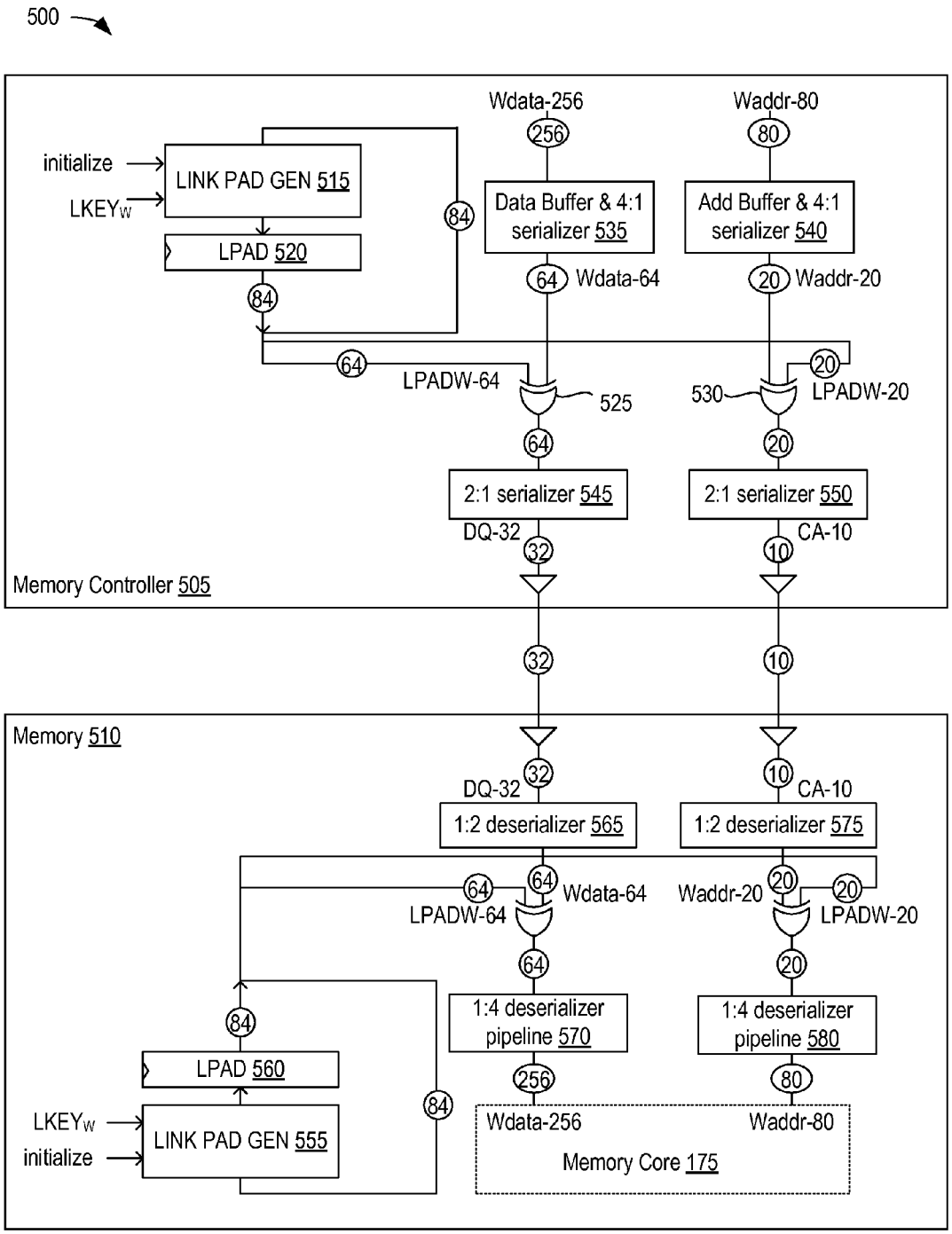
FIG. 5 depicts a memory system 500 in accordance with an embodiment in which shared security resources are used to encrypt write data and write addresses at a controller 505, and to decrypt the encrypted write data and addresses at a memory 510.

Mask-offset logic 492 receives its own mask CA-maskH-OFF and key CA-keyH-OFF, and performs an AND function of each mask bit with a corresponding bit of its key to produce control signals COLoffset, ROWoffset, BANKoffset, and RANKoffset. Assuming a corresponding asserted mask bit, each logic-one key bit asserts an offset bit that causes an XOR gate to invert the corresponding output from swap logic 493. The key CA-keyH-OFF can be fixed or time variant. FIG. 5 depicts a memory system 500 in accordance with an embodiment in which shared security resources are used to encrypt write data and write addresses at a controller 505, and to decrypt the encrypted write data and addresses at a memory 510. On the controller, the security resources include an 84-bit link-pad generator 515, a link-pad register 520, a 64-bit XOR gate 525, and a 20-bit XOR gate 530. A 4:1 data buffer and serializer 535 produces 64-bit write data Wdata-64 from 256-bit write data Wdata-256 from e.g. a processor, and a 4:1 address buffer and serializer 540 produces 20-bit addresses Waddr-20 from 80-bit addresses Waddr-80. XOR gate 525 combines write data Wdata-64 with a 64-bit pad value LPADW-64 from register 520, and the resultant encrypted write data is presented to a 2:1 serializer 545 so that controller 505 conveys encrypted 32-bit data DQ-32 to memory 510. Write addresses Waddr-80 are similarly encrypted and serialized using serializer 540, XOR gate 530, and a second 2:1 serializer 550 to produce ten-bit command signals CA-10 to memory 510.

The write data and addresses are encrypted using subsets of bits from the same link-pad generator 515. As detailed below, this sameness means the bits from one subset of the pad-key value are used in calculating subsequent bits of the other subset. An 84-bit pad generator can be made to repeat far less frequently than a 64- or 20-bit generator, so the resultant encryption appears more random in this embodiment than in ones in which the data and addresses are encrypted using separate and relatively shorter pad-value generators.

Memory 510 decrypts the incoming data and addresses using security circuitry similar to that used for encryption. A link-pad generator 555 and register 560 provide 84-bit link pad values. Generator 555 is seeded with an initial key LKEYw identical to that of the corresponding generator 515 on the controller, and steps through the same sequence of 84-bit pad values. For decryption, 64 bits of each pad value are XORed with the output of a data serializer 565, and 20 bits are XORed with the output of an address deserializer 575. A 1:4 deserializer 570 converts the incoming decrypted data back to the original 256-bit number and conveys it to memory core 175. The decrypted address is also deserialized in this embodiment, by a 1:4 deserializer 580, with the resultant 80-bit address presented to core 175 to specify the storage location of the incoming data. The stored data is plaintext in the example, but can be ciphertext in other embodiments (see e.g., the example of FIG. 3).

Figure 6:
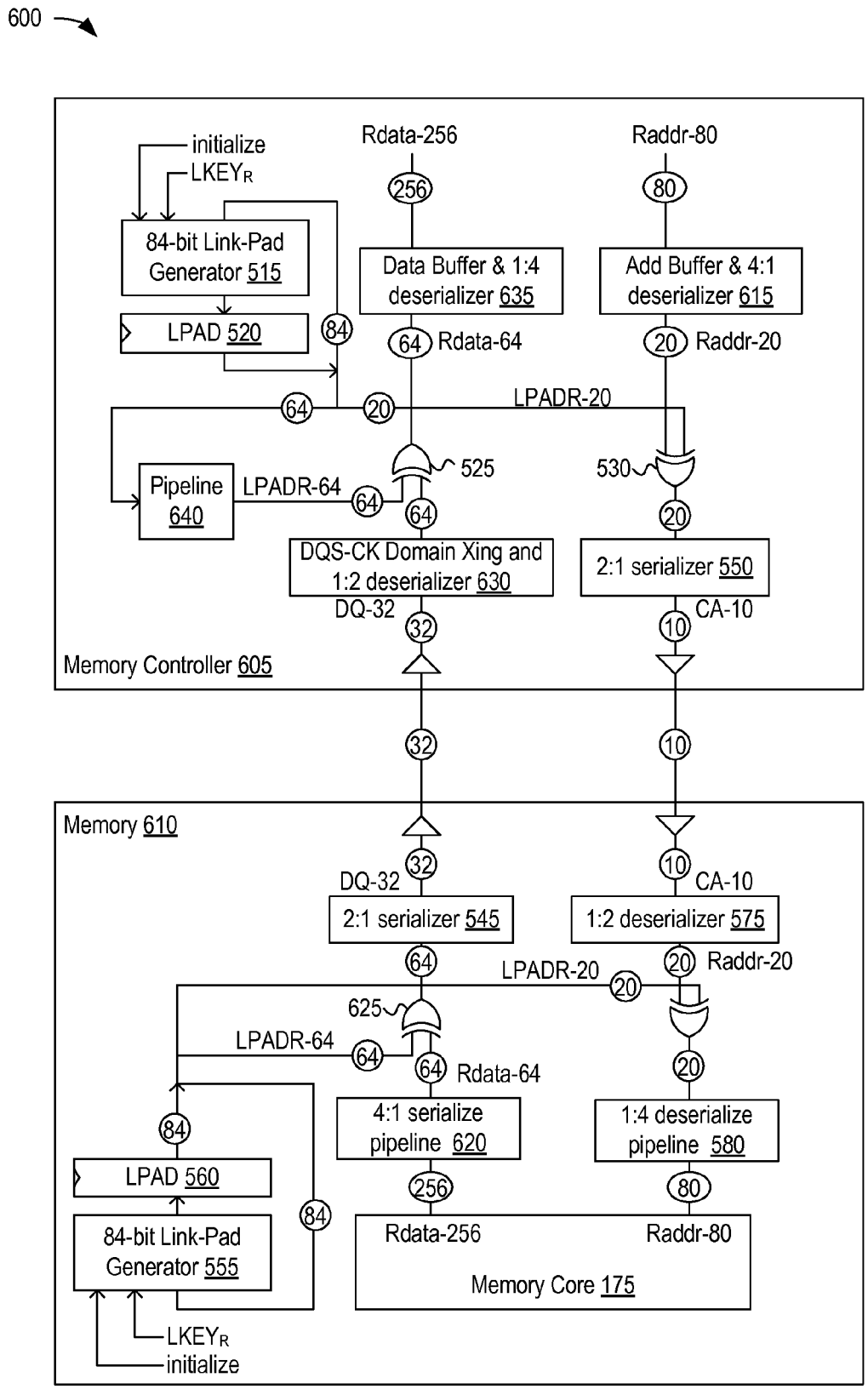
FIG. 6 depicts a memory system 600 in accordance with an embodiment in which shared security resources are used to secure read data and read addresses shared between a controller 605 and a memory 610.

FIG. 6 depicts a memory system 600 in accordance with an embodiment in which shared security resources are used to secure read data and read addresses shared between a controller 605 and a memory 610. System 600 is similar to systems detailed above, with like-identified elements being the same or similar.

On the controller, the security resources include an 84-bit link-pad generator 515, a link-pad register 520, a 64-bit XOR gate 525, and a 20-bit XOR gate 530. An address buffer and serializer 615 serializes 80-bit addresses Raddr-80 to 20-bit addresses Raddr-20, which XOR gate 530 combines with twenty bits from register 520. A serializer 550 serializes the resultant 20-bit encrypted addresses to convey encrypted 10-bit addresses CA-10 to memory 610. Memory 610 employs an XOR gate and a pair of deserializers 575 and 580, as detailed in connection with FIG. 5, to present decrypted 80-bit addresses to memory core 175.

For read accesses, memory core 175 presents the addressed data as 256 bits to a serializer 620, which converts the read data to 64-bit data Rdata-64 conveyed at four times the data rate from core 175. An XOR gate 625 combines data Rdata-64 with 64 bits from pad register 560 and conveys the resultant encrypted data to a serializer 545. Encrypted 32-bit read data DQ-32 is then communicated to controller 605 at eight times the data rate from the core.

The encrypted 32-bit data DQ-32 is synchronized with the controller time domain and deserialized to 64 bits by domain-crossing circuit/deserializer 630. XOR gate 525 combines the resultant 64-bit encrypted data with 64 bits from pad register 520 to decrypt that read data, thus producing plaintext read data Rdata-64. Finally, a buffer/deserializer 635 converts the plaintext to 256-bit read data Rdata-256.

Link pad generators 515 and 555 are initialized using the same link key $LKEY_R$, and sequence through the same deterministic sequence of pad values. This initialization is performed when the system is powered-up, both in controller 505 and memory 510, as indicated by the common signal "initialize." Generators 515 and 555 only increment when read or write operations are being performed in this example, so the initialization can be done with a simple control pin or control register operation with no real timing constraints between the controller and the memory. Address encryption at controller 505 takes place before decryption. Generator 555 is delayed relative to generator 515 during the initialization process so that the same pad values are used to encrypt and decrypt each unit of information. Initialization methods and circuits for synchronizing pad-value generation on either side of a communication channel are well known, so a detailed discussion is omitted.

Read-data encryption at memory 610 takes place before decryption at controller 605, so the link pad values employed for read-data decryption are likewise delayed. In the instant example, a pipeline register 640 in controller 605 delays application of link-pad values LPADR-64 to the incoming encrypted read data. In other embodiments the encrypted read data is buffered at the memory or controller rather than or in addition to the link-pad values to impose the requisite delay.

Figure 7:
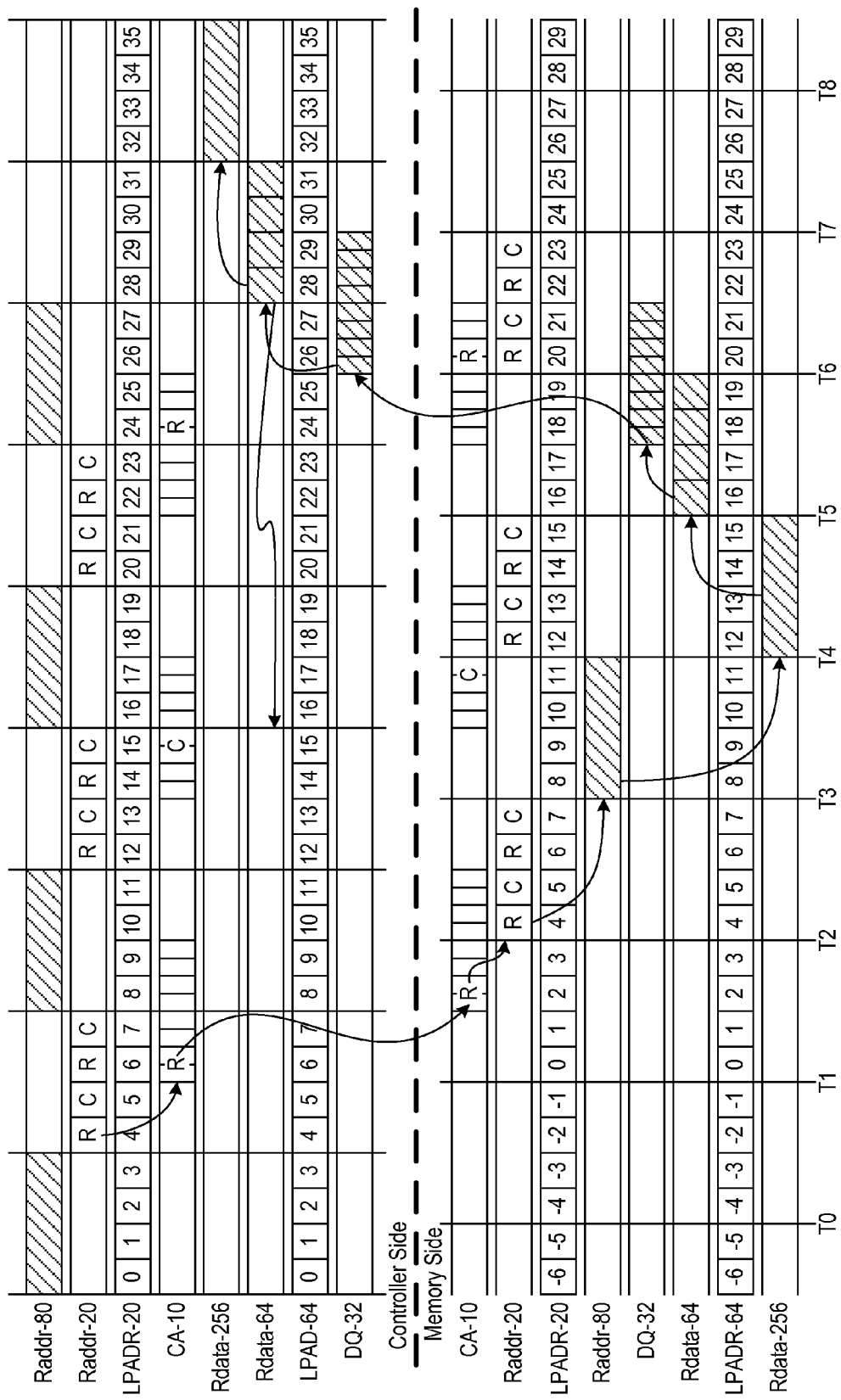
FIG. 7 is a waveform diagram illustrating the read timing for an embodiment of system 600 of FIG. 6.

FIG. 7 is a waveform diagram illustrating the read timing for an embodiment of system 600 of FIG. 6. Link-pad generators 515 and 555 are assumed to have been initialized using the same key, with generator 515 advanced by six clock cycles to accommodate the delay between address encryption at controller 605 and decryption at memory 610. This offset can be fixed if the timing of system 600 is well defined, or can be configurable to accommodate variables in the signaling environment, such as to allow for communication channels of different lengths.

The example of FIG. 7 assumes a read access begins at time zero, at which time controller 605 presents an 80-bit address Raddr-80 to deserializer 615. Deserializer 615 breaks the 80-bit address into four sequential 20-bit address fields that specify alternating sets of row and column (R and C) address bits. Link pad values four to seven (4-7) are applied to respective 20-bit address fields, and the resultant encrypted addressing information is again serialized, this time to create a sequence of eight 10-bit address fields labeled CA-10.

The 10-bit address fields are communicated to deserializer 575 on memory 610 after some channel delay, and are serialized to recover the 20-bit row and column address fields R and C. Due to the offset imposed on generator 515 during initialization, pad values 4-7 used to encrypt the address fields are available from register 560 at the correct timing for recovering the address information. Read address Raddr-80 is therefore recovered at time T3 on memory 610.

Memory core 175 delivers 256 bits of data responsive to read address Raddr-80, at time T4 in this example. Serializer 620 converts the read data to successive 64-bit subsets Rdata-64 that begin at time T5 and are encrypted using pad values sixteen through nineteen (16-19). Serializer 545 then serializes encrypted read data Rdata-64 to produce 32-bit data DQ-32 for conveyance to controller 605.

In this example encrypted data DQ-32 arrives at the controller side at time T6. Deserializer 630 halves the data rate and produces four consecutive fields of encrypted 64-bit data Rdata-64 synchronized with pad values twenty-eight through thirty-one (28-31). Recalling that the data was encrypted at memory 610 using pad values sixteen through nineteen, the waveform diagram shows that pad generator 515 has advanced twelve pad values past the requisite sequence for decrypting data Rdata-64. Pipeline 640 is configured to retard application of pad values to XOR gate 525 by twelve values to establish the correct timing alignment. Other circuit configurations can be used to produce the correct timing alignment between read data and pad values in other embodiments. For example, one or more pad buffers on memory 610 can be used to retard address pad values relative to data pad values.

Figure 8:
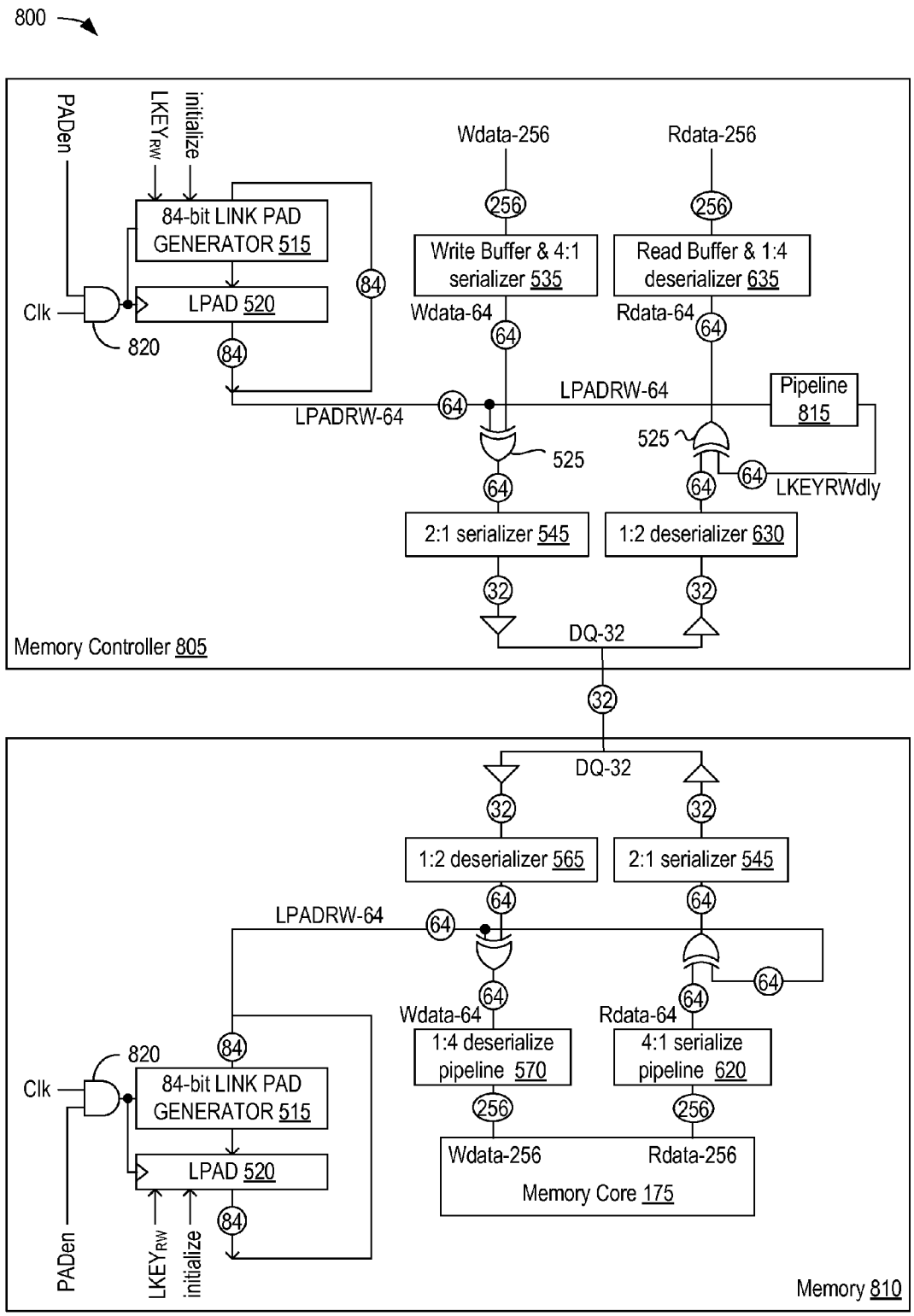
FIG. 8 depicts a memory system 800 in accordance with an embodiment in which shared security resources are used to secure both write and read data shared between a controller 805 and a memory 810.

FIG. 8 depicts a memory system 800 in accordance with an embodiment in which shared security resources are used to secure both write and read data shared between a controller 805 and a memory 810. System 800 is similar to the systems detailed previously in connection with FIGS. 5-7, with like-identified elements being the same or similar. Controller 805 includes a pad-value pipeline 815 that introduces a delay in the pad values applied to read data relative to those applied to write data. This delay allows the shared security resources to support rapid read/write turn-around times without reusing pad values. The reuse of pad values for read/write turn-arounds would create security vulnerabilities, and is therefore undesirable.

The data encrypted and decrypted by controller 805 and memory 810 is 64 bits, and is encrypted using 64-bit pad values. Pad-value generators 515 and register 520 generate 84-bit values, twenty of which may be used to secure addresses. Even if the extra bits are not used to encrypt or decrypt information, they increase the repeat interval of the pad-value generators, and thus the evident randomness and concomitant security of the pad values.

Support for rapid read/write turn arounds is beneficial for memory performance. Very rapid read/write turn arounds may not afford sufficient time for the shared security resources to advance the pad values, however, and may therefore require reuse of pad values for successive memory transactions. While such embodiments do afford some security, particularly in comparison to systems that communicate plaintext, attacks that employ read/write turn arounds can be used to glean information about how information is secured, and thus to breach security. Pipeline 815 delays application of key pads to incoming read data to support rapid turn arounds without the undesirable reuse of pad values.

Advancing pad-value generators consumes more power than maintaining their current state, so some embodiments only advance the generators when new pad values are needed. To this end, both controller 805 and memory 810 each include an AND gates 820 that receives a pad-enable signal PADen to gate a clock signal Clk that advances link pad generators 515.

Figure 9:
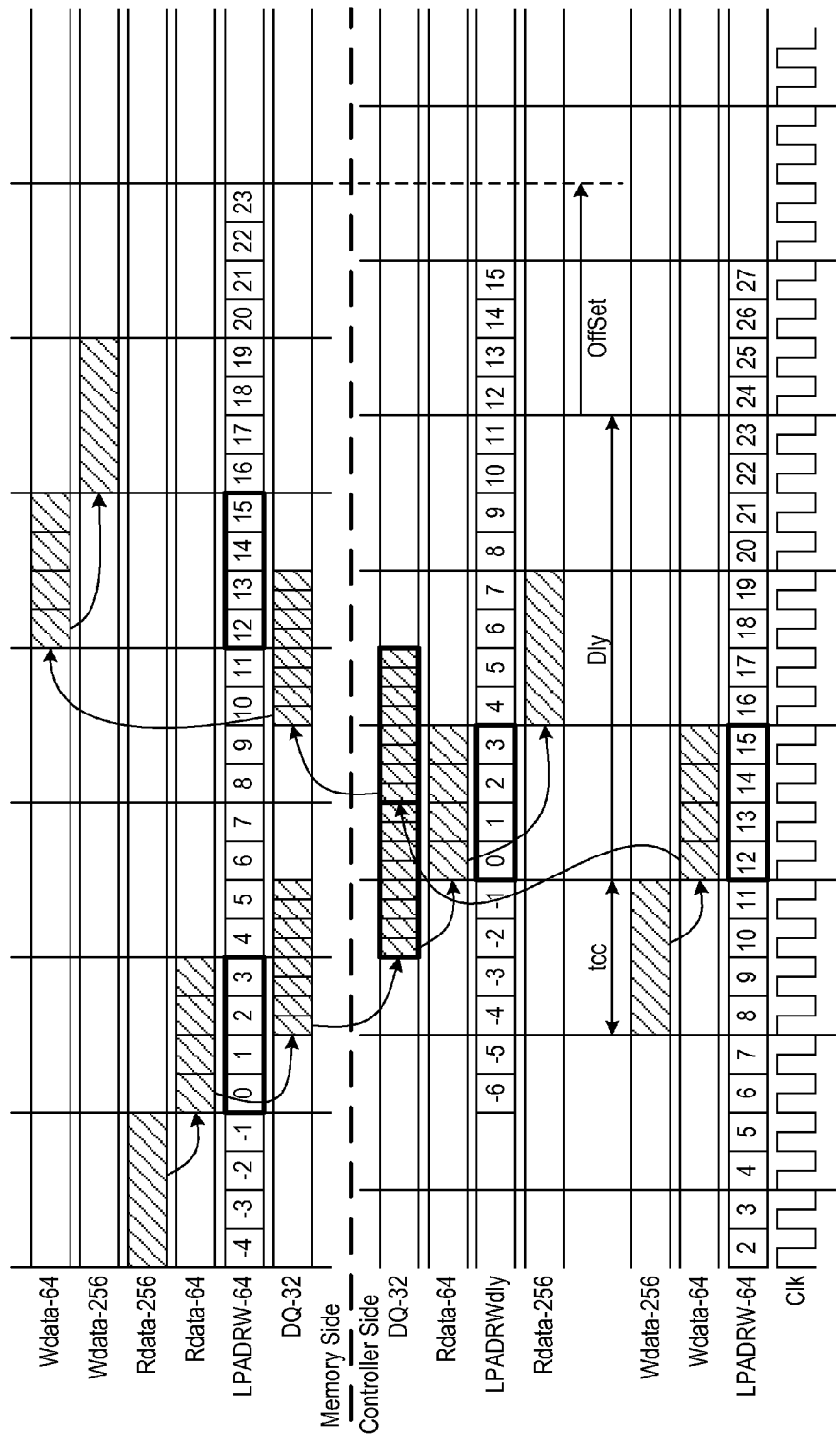
FIG. 9 is a waveform diagram 900 illustrating the operation of memory system 800 in accordance with an embodiment in which link-pad generators 515 advance on each clock cycle (e.g., AND gates 820 and signals PADen are omitted).

FIG. 9 is a waveform diagram 900 illustrating the operation of memory system 800 in accordance with an embodiment in which link-pad generators 515 advance on each clock cycle (e.g., AND gates 820 and signals PADen are omitted). Diagram 900 shows back-to-back read and write operations closely spaced in time to take full advantage of the bandwidth provided by the channel between controller 805 and memory 810. The following discussion assumes that pad generators 515 produce identical pad-value streams, and are initialized to produce a timing offset—about six cycles of signal Clk in this example—to accommodate the time delay between write-data encryption at controller 805 and write-data decryption at memory 810.

Beginning with a 256-bit unit of read data Rdata-256 at the far left, memory 810 serializes this information to create four 64-bit subsets Rdata-64, each of which is encrypted using a respective one of pad values zero to three (0-3). The resultant ciphertext is serialized once more to create a sequence of eight 32-bit values, which are conveyed to controller 805 via data channel DQ-32.

The data channel imposed about two clock cycles of delay in this example, but the delay need not be increments of a clock period. Controller 805 deserializes the ciphertext to the four 64-bit subsets Rdata-64 and decrypts each one using a respective pad value LPADRWdly. The applied pad values are delayed by a delay Dly relative to the pad values LPADRW-64 from the resident pad generator 515 so that the decryption pad values match the encryption pad values applied to the same data. Controller 805 thus recovers the 256-bit data Rdata-256 first read from memory core 175.

For an optimum read/write turn-around time, controller 805 conveys write data to memory 810 on channel DQ-32 immediately after arrival of the read data. To accomplish this, four 64-bit subsets Wdata-64 serialized from a 256-bit unit of write data are encrypted while read data Rdata-64 is decrypted. Rather than using the same pad values, the delay Dly between pad values LPADRW and LPADRWdly allows the encryption of write data and the decryption of read data to occur simultaneously with different pad values twelve to fifteen (12-15). The encrypted write data is conveyed to memory 810 and deserialized to create write data Wdata-64, each subset of which is timed to the correct one of pad values twelve to fifteen generated at memory 810. The decryption thus produces the write data Wdata-256 initially source by controller 805.

Figure 10:
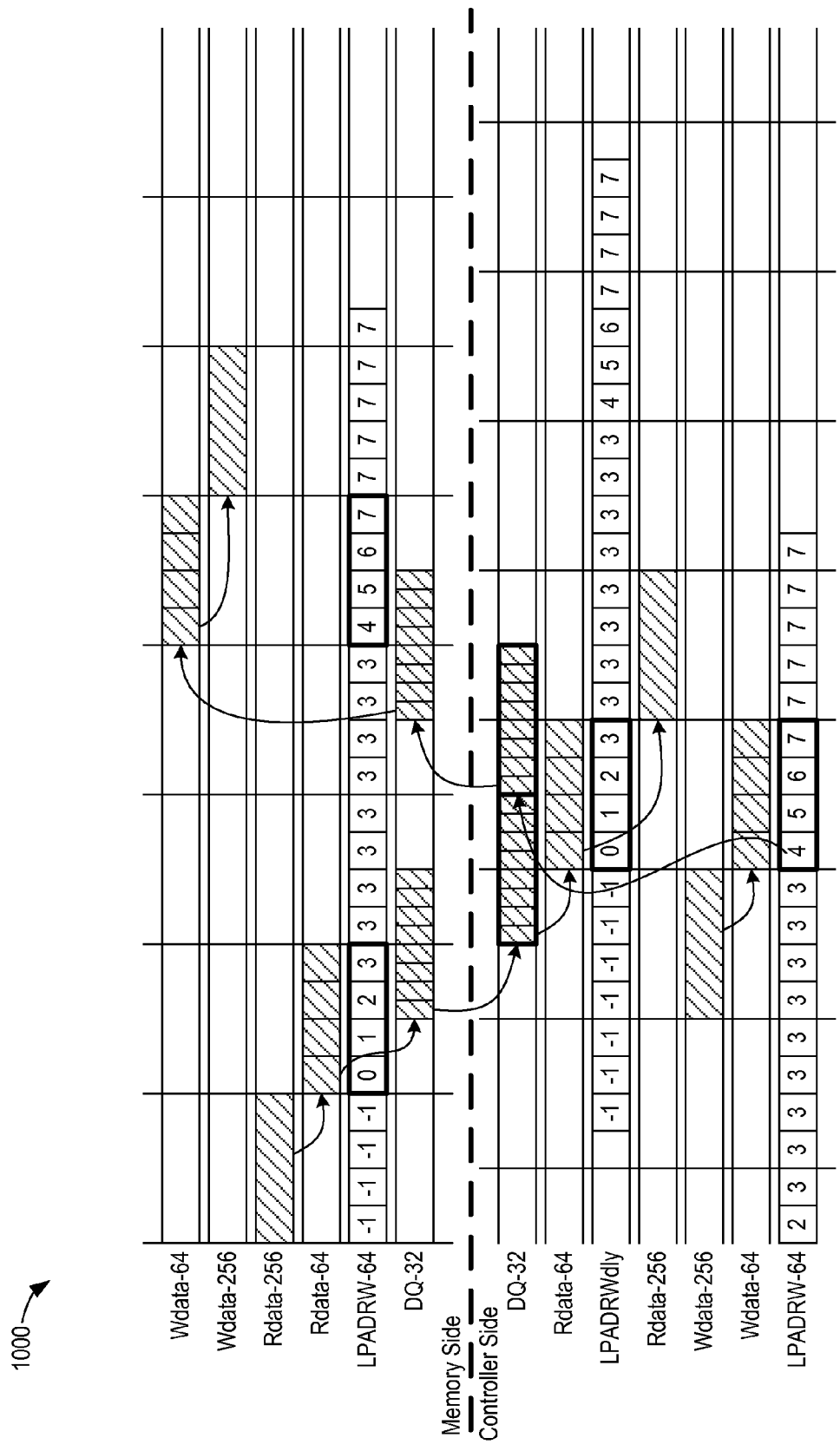
FIG. 10 is a waveform diagram 1000 illustrating the operation of memory system 800 in accordance with an embodiment in which link-pad pad generators 515 pause when not in use (e.g., AND gates 820 and signals PADen are included).

FIG. 10 is a waveform diagram 1000 illustrating the operation of memory system 800 in accordance with an embodiment in which link-pad generators 515 pause when not in use (e.g., AND gates 820 and signals PADen are included). Diagram 1000 shows back-to-back read and write operations closely spaced in time to take full advantage of the bandwidth provided by the channel between controller 805 and memory 810. AND gates 820 each receive a pad-enable signal PADen that allows their respective pad-value generators to advance when new pad values are required. Signal PADen can be driven by memory commands that are shared between controller 805 and memory 810, and is derived from column-access commands in one embodiment.

Pipeline 815 induces a pad-key offset on the controller in this example, but other circuits can be used at the controller or memory in other embodiments to support short read/write turn-around times without pad-value reuse. In another embodiment, for example, read buffer and deserializer 635 can be modified to include pipeline 815, or to otherwise produce the requisite alignment of pad values and read data.

Figure 11:
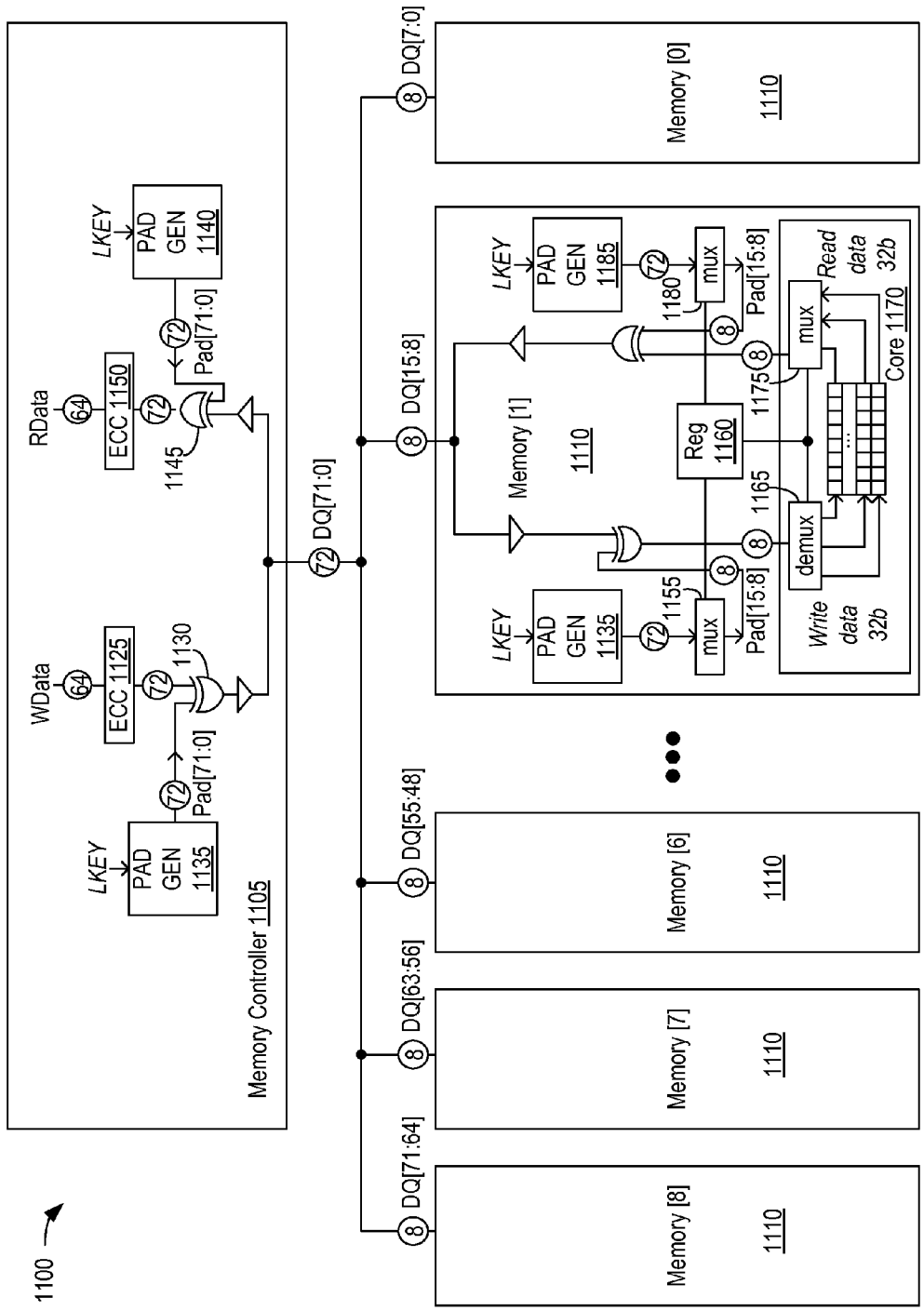
FIG. 11 depicts a memory system 1100 that secures read and write data while accommodating memories of different data widths.

FIG. 11 depicts a memory system 1100 that secures read and write data while accommodating memories of different data widths. A memory controller 1105 can be configured to communicate with nine memories of width eight or eighteen memories of width four. The memories can be of fixed data widths, but the example of FIG. 11 includes nine width-configurable memories 1110. In some examples the width configurability can be used, e.g., to implement Dynamic Point-to-Point (DPP) signal interfaces. DPP interfaces combine the performance benefits of point-to-point signaling with the flexibility of multi-drop topologies.

Controller 1105 can function as detailed previously, so a detailed treatment is omitted. Briefly, an error-correction encoder 1125 encodes 64 bits of write data WData and passes the resultant 72-bit encoded data to an XOR gate 1130, which combines the encoded data with 72-bit pad values Pad[71:0] from a pad generator 1135 to send encrypted data DQ[71:0] to memories 1110; a pad generator 1140, XOR gate 1145, and error-correction decoder 1150 work similarly to recover read data RData from encrypted data DQ[71:0] read from memories 1110.

Each memory 1110 has a data width of eight, and is connected to controller 1105 via a respective eight-bit subset of the 72 links DQ[71:0] to controller 1105. The detailed memory labeled "Memory [1]," for example, is connected to data links DQ[15:8], and thus communicates eight of seventy-two data bits for each memory transaction. To support secure write transactions, memory 1110 includes a 72-bit pad generator 1135 that issues the same pad-value sequence as generator 1135, but offset in time to accommodate the delay between encryption and decryption. A multiplexer 1155 selects eight bits Pad[15:8] from pad generator 1135 that are bit aligned with the incoming data DQ[15:8]. A register 1160 is initialized to specify the correct subset of pad bits, and also controls a demultiplexer 1165 to convert whatever data width is presented to core 1170 to thirty-two bits. In the read direction, a multiplexer 1175 converts the thirty-two bit data from core 1170 to eight-bit data, and an XOR gate combines this data with eight bits Pad[15:8] from a seventy-two bit pad value from a generator 1185. Multiplexer 1175 and the subset of pad values Pad[15:8] employed for this encryption is determined by the contents of register 1160.

Each register 1160 is set during system initialization so that its stored value reflects a specific subset of data links DQ[71:0]. In the depicted configuration, each of memories 1110 is a memory module or integrated-circuit (IC) die that communicates eight-bit data via a respective eight-bit subset of links DQ[71:0]. System 1100 is easily configured to accommodate more or fewer memories. To double the available memory resources, for example, system 1100 can be configured to include eighteen memories 1110, each configured to communicate four-bit data via a respective one of sixteen subsets of links DQ[71:0]. With reference to memory Memory[1], assume for example that the memory is connected to data links DQ[15:12] to communicate four bits rather than eight. To achieve this relatively narrow configuration, register 1160 may be programmed such that multiplexers 1155 and 1180 select pad bits Pad[15:12], and demultiplexer 1165 and multiplexer 1175 perform the requisite conversions between four and thirty-two bits. This configuration on the memory side need not affect controller 1105.

The error-correction circuitry of system 1100 extends the write and read data from sixty-four bits to seventy two. Similar embodiments without error correction, and the concomitant data-width increase, provide the same amount of storage using e.g. eight eight-bit memories or sixteen four-bit memories serving a sixty-four bit data channel.

Figure 12:
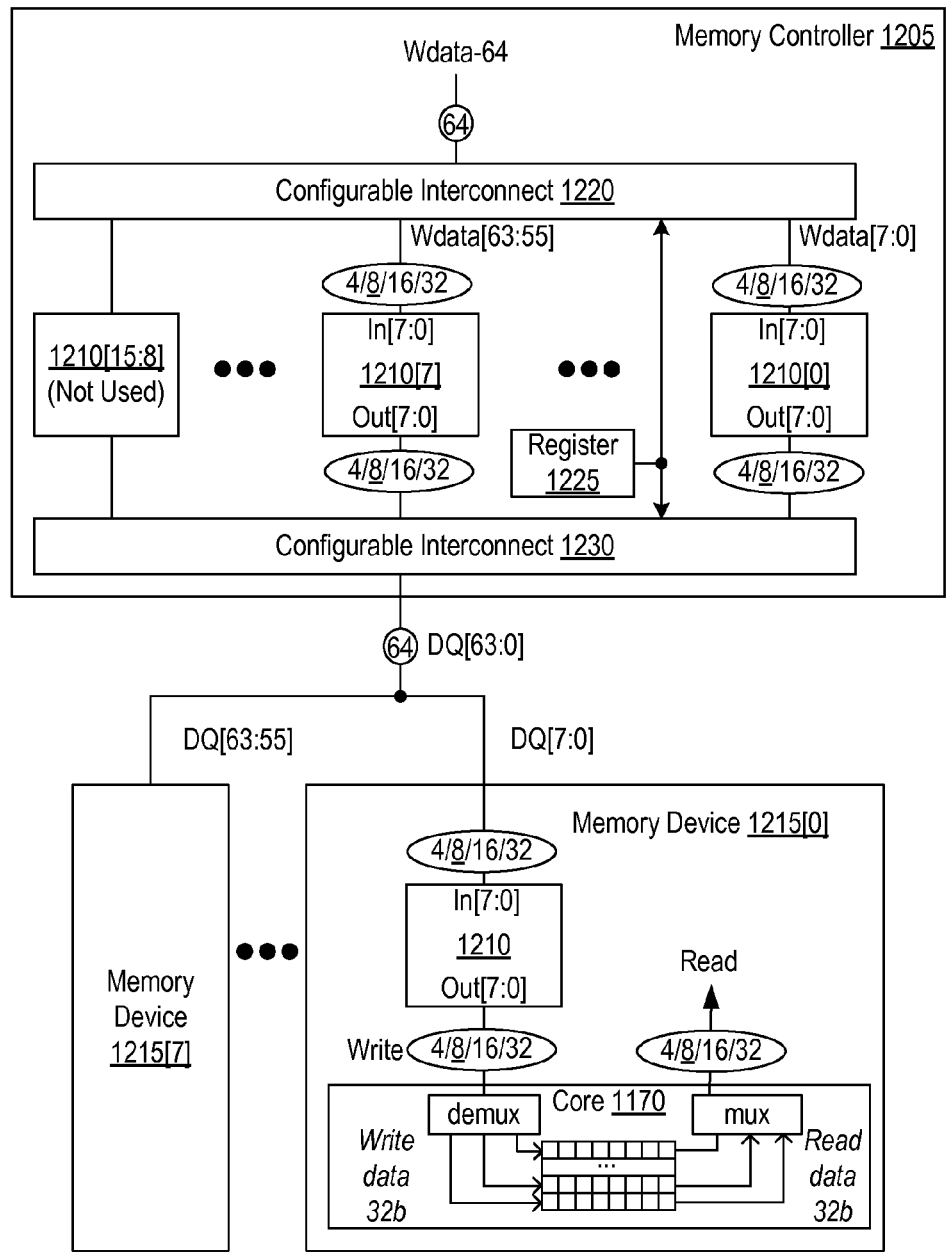
FIG. 12 depicts another embodiment of a memory system 1200 that secures read and write data while accommodating memories of different data widths.

FIG. 12 depicts another embodiment of a memory system 1200 that secures read and write data while accommodating memories of different data widths. This embodiment includes a memory controller 1205 with sixteen variable-width security circuits 1210[15:0] for communicating with up to sixteen memories 1215. In particular, system 1200 can be configured to communicate with two thirty-two-bit memories, four sixteen-bit memories, eight eight-bit memories, or sixteen four-bit memories. The memories can be of fixed data widths, but this embodiment is shown to include width-configurable memories 1215. Encryption and decryption circuitry is only depicted for the write direction: read circuitry is essentially the same.

Controller 1205 conveys error-corrected write data Wdata-64 to a configurable interconnect 1220 that distributes the write data to security circuits 1210 based on the contents of a programming register 1225. Depending upon the width setting, interconnect 1220 can direct four bits to each of sixteen security circuits 1212, eight bits each to half of security circuits 1212, or sixteen bits each of four of security circuits 1212. The contents of register 1225 also configures a second configurable interconnect 1230 to make the same width selections at the outputs of security circuits 1210. In the depicted example controller 1205 is configured such that eight security circuits 1210[7:0] are each configured to receive and deliver eight-bits of write data to respective memories 1215[7:0] on respective data channels, and each memory device is configured to support a data width of eight bits. The eight remaining security circuits 1210[15:8] on controller 1205 are disabled to save power, but are available for configurations that support more memory channels. Data busses that support variable data widths are labeled "4/8/16/32," with the "8" underlined to indicate the depicted configuration.

Each memory 1215 has a security circuit 1210 that is width configured and synchronized to communicate with a corresponding security circuit 1210 on controller 1205. In this configuration, for example, security circuits 1210[0] and 1210[7] of controller 1205 are synchronized with security circuits 1210 of memories 1215[0] and 1215[7], respectively. A register in each memory, similar to register 1160 of FIG. 11, is initialized to set the widths of security circuits 1210 and the serialization/deserialization of the demultiplexer and multiplexer within core 1170.

Figure 13:
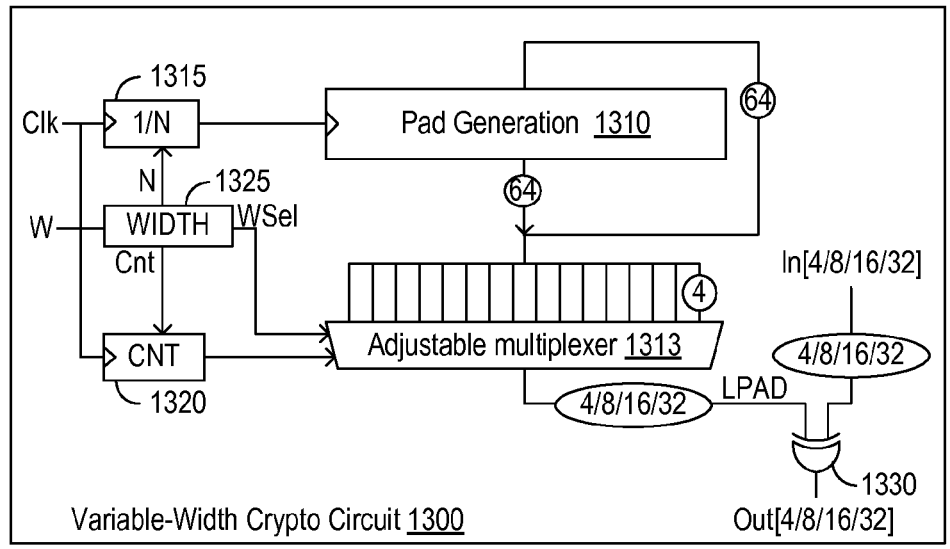
FIG. 13 depicts a variable-width cryptography circuit 1300 that may be used for security circuits 1210[15:0] in controller 1205 and memories 1215[7:0] of FIG. 12.

FIG. 13 depicts a variable-width cryptography circuit 1300 that may be used for security circuits 1210[15:0] in controller 1205 and memories 1215[7:0] of FIG. 12. Circuit 1300 supports data widths of four, eight, sixteen, and thirty-two bits. Settings for these width configurations are summarized in a table 1305.

Cryptography circuit 1300 includes pad-generation circuitry 1310, an adjustable multiplexer 1313, a clock divider 1315, a counter 1320, and a width-selection register 1325 that collectively form a link-pad generator to issue a sequence of pad values LPAD. Depending upon the configuration, the pad-value width can be four, eight, sixteen, or thirty-two bits. Cryptography circuit 1300 additionally includes a cipher circuit 1330, an XOR gate in this example, connected to input port In[4/8/16/32] and to the output from the link-pad generator to combine incoming text (e.g. plaintext data or pre-encrypted data) with pad values LPAD to produce ciphertext. Width-selection register 1325 is loaded via a width-selection port W to configure the width of circuit 1300. Register 1325 is part of cryptography circuit 1300, but can be external with its contents shared among multiple cryptography circuits in the manner of register 1225 in FIG. 12.

With reference to table 1305, circuit 1300 can be configured to support four, eight, sixteen, or thirty-two communication links. In the example of FIG. 12, this configurability supports data widths W of the same four values. In the second column, the value N refers to the number of memories in a memory system that communicates over 64 data links. N is sixteen, for example, if each of the memories is configured to have a width of four. The next column, width-select WSel, corresponds to the input to multiplexer 1313 that determines the width of its output to cipher circuit 1330. The final column, count signal Cnt, lists the extent to which clock signal Clk is divided down to advance pad-generation circuit 1310.

The following discussion describes the operation of circuit 1300 should register 1325 store a value indicative of a thirty-two-bit data width, which is represented by the last row of table 1305. The value N is set to two so that pad-generation circuit 1310 advances every second period of clock signal Clk. Width-select signal WSel causes multiplexer 1313 to issue subsets of thirty-two bits, and count signal Cnt causes counter 1320 to advance by eight counts for each clock cycle. Each count selects a neighboring four bits on the input, so advancing by eight counts selects the next thirty-two bits. The link-pad generator thus derives successive, relatively narrow pad values LPAD from a sequence of relatively wider pad values from pad generation circuitry 1310.

Circuit 1300 saves power when configured for relatively narrow widths by reducing the frequency with which pad-generation circuit 1310 is advanced to a new pad value. With reference to the four-bit configuration of the top row of table 1305, the value N is set to sixteen so that pad-generation circuit 1310 advances every sixteenth period of clock signal Clk. Pad-generation circuit 1310 thus produces one eighth the pad bits as the thirty-two-bit configuration. Width-select signal WSel causes multiplexer 1313 to issue subsets of four bits, and count signal Cnt causes counter 1320 to advance by one count for each clock cycle to select the next four bits.

Figure 14:
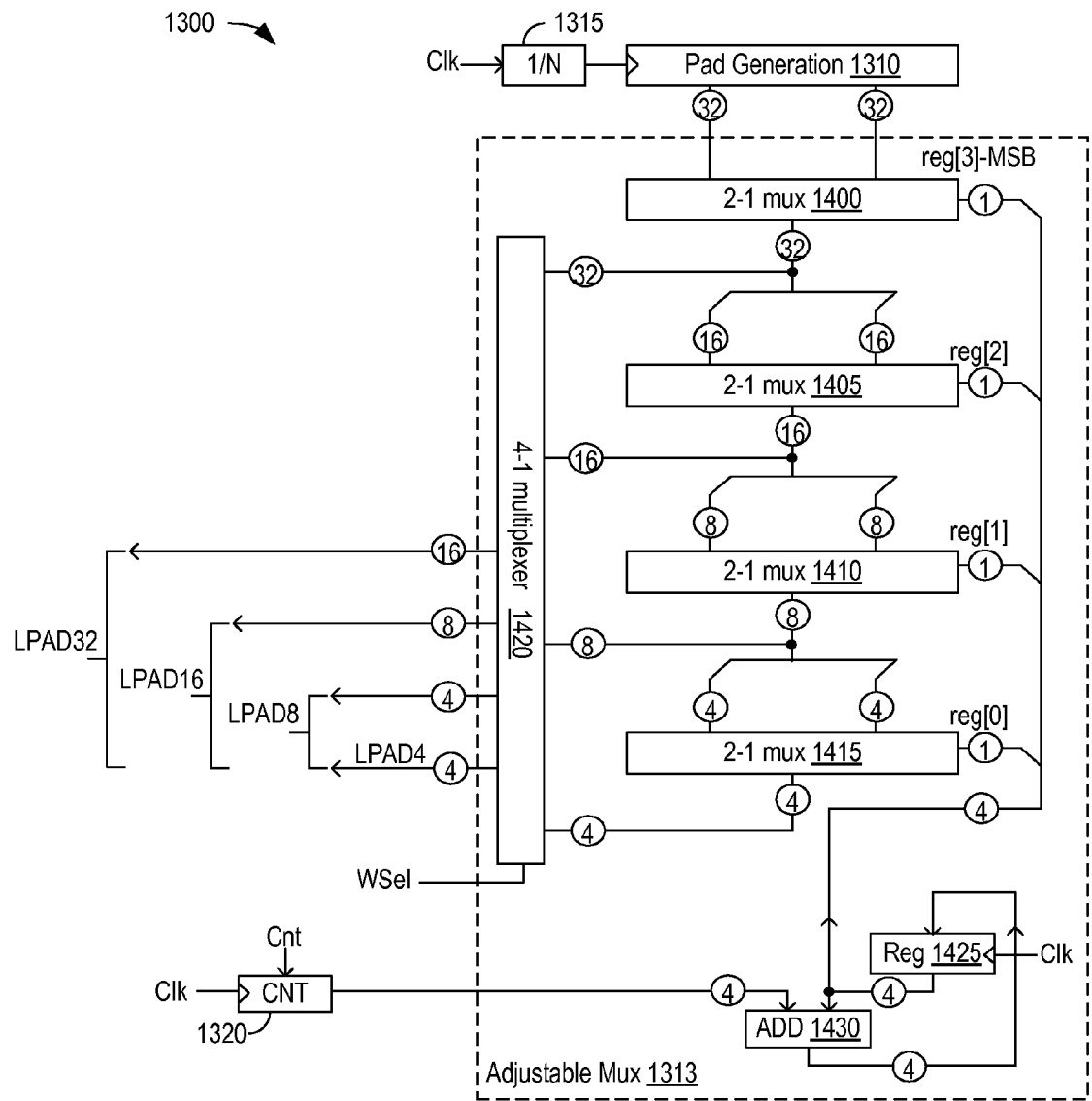
FIG. 14 details aspects of an embodiment of cryptography circuit 1300 of FIG. 13, which particular attention paid to the workings of an embodiment of variable-width multiplexer 1313.

FIG. 14 details aspects of an embodiment of cryptography circuit 1300 of FIG. 13, which particular attention paid to the workings of an embodiment of variable-width multiplexer 1313. Multiplexer 1313 includes four 2:1, fixed-width multiplexers 1400, 1405, 1410, and 1415, a 4:1 fixed-width multiplexer 1420, a four-bit register 1425, and an adder 1430. Multiplexer 1313 responds to the input signals detailed in connection with FIG. 13 to provide the width configurations of table 1305.

Figure 15:
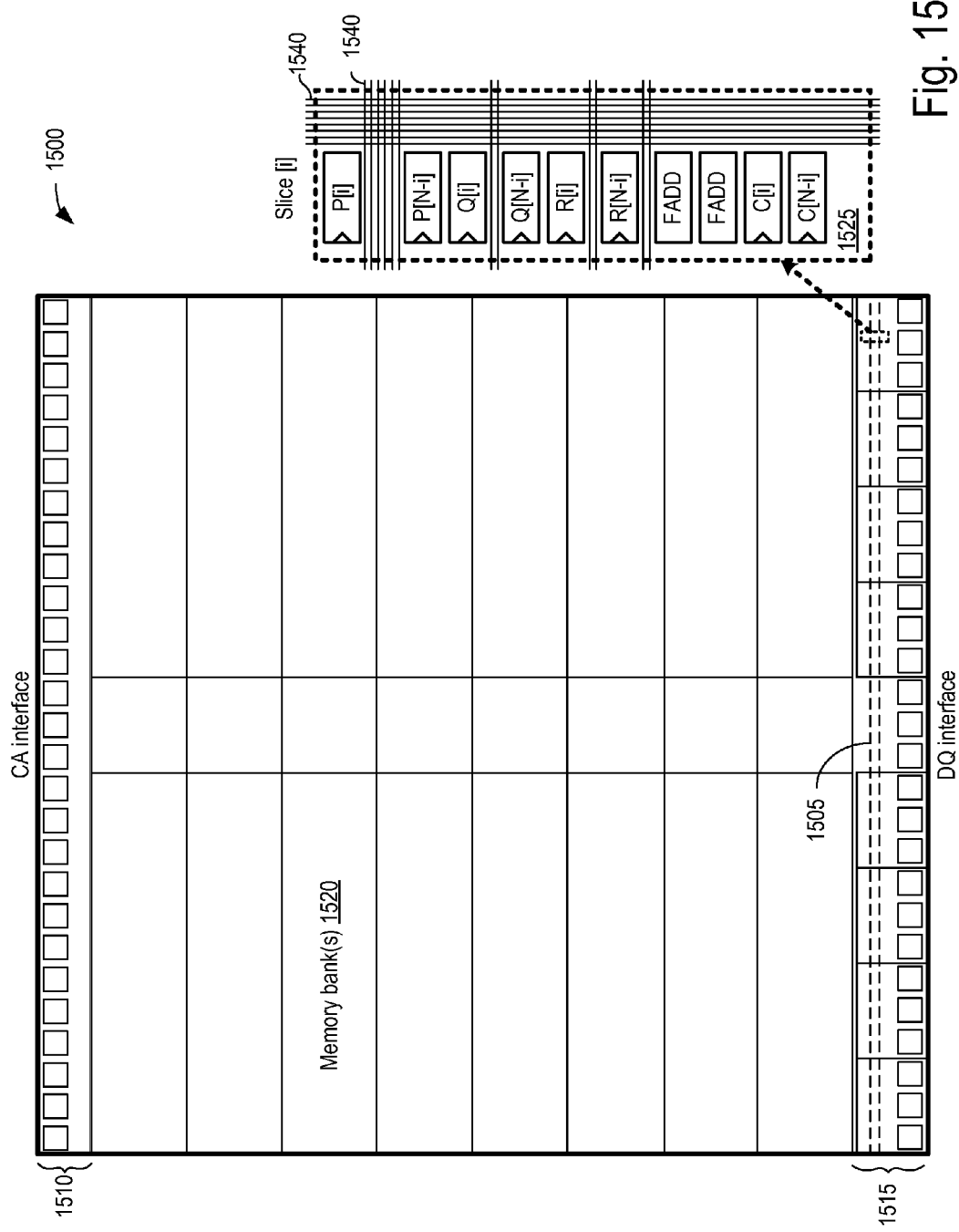
FIG. 15 is a plan view of a memory die 1500 that includes integrated security circuitry 1505 in accordance with one embodiment.

FIG. 15 is a plan view of a memory die 1500 that includes integrated security circuitry 1505 in accordance with one embodiment. Security circuitry 1505 is laid out and its interconnections routed in an area-efficient, and therefore cost-effective, manner. Also advantageous, security circuitry 1505 supports two operational modes, a first mode in which it uses integrated combinational and sequential logic to derive an initial pad value using a shared-key algorithm, and a second mode in which it repurposes some of that logic to generate a sequence of pad values. Some embodiments use available memory resources to assist in key generation.

Memory die 1500 includes a command interface 1510 and a data interface 1515 to facilitate access to one or more memory banks 1520. Security circuitry 1505 occupies a stripe arranged along column input/output circuitry (not shown) within interface 1515. This arrangement affords circuitry 1505 access to columns of data for encryption and decryption. A similar stripe of security circuitry can be provided for and within command interface 1510, but is omitted in this example.

Security circuitry 1505 comprises a number of slices 1525, one for each data column for example. Each slice 1525 includes a number of sequential storage elements—designated with clock terminals—and full adder FADD, the purposes of which are detailed in connection with later figures. Slices 1525 are interconnected to form pad-sequencing logic to perform various security operations. DRAM dies have relatively few metal layers, so security circuitry 1505 is optimized to require few wires 1540.

Figure 16:
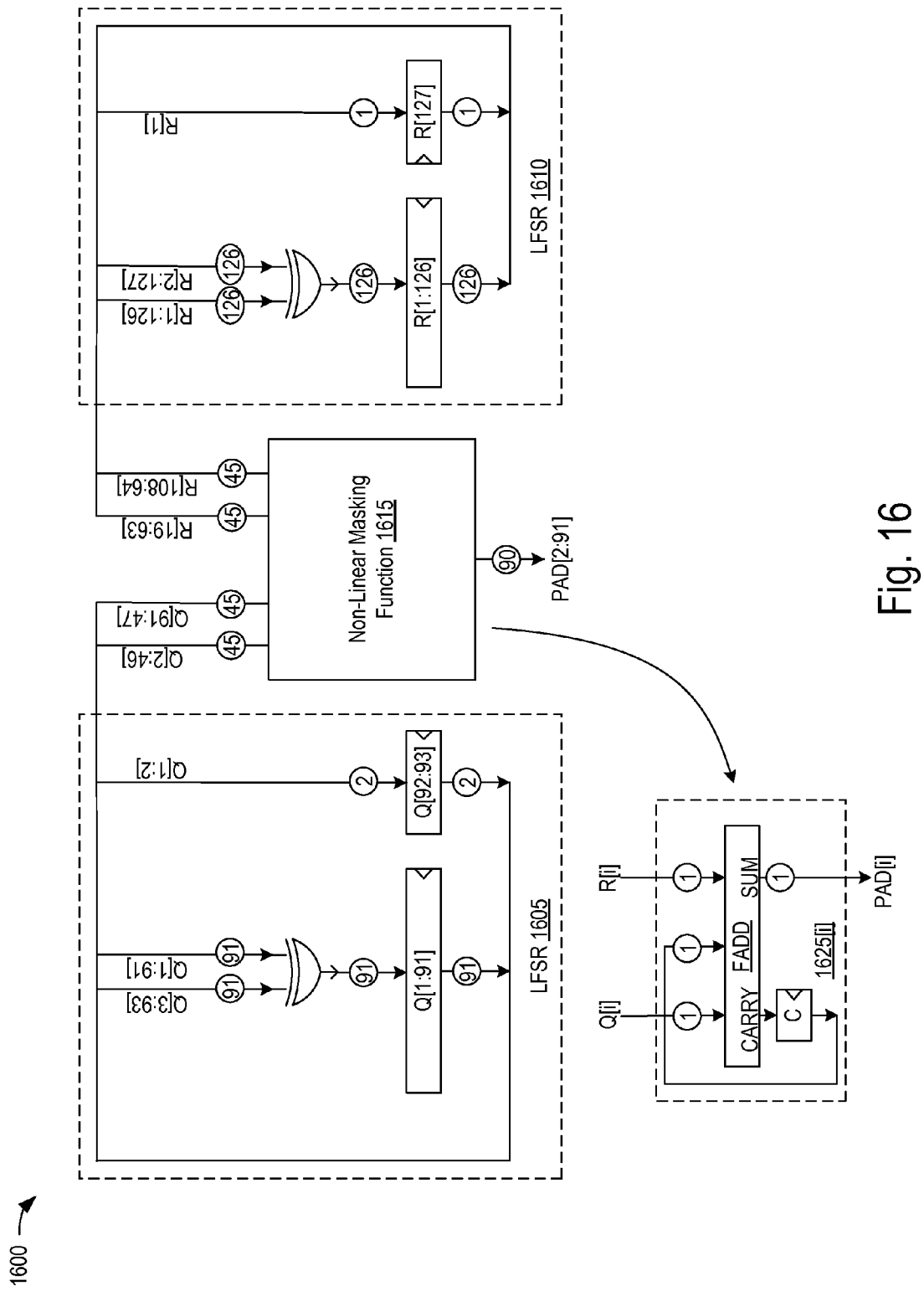
FIG. 16 schematically depicts security circuitry 1600 that can be used as security circuitry 1505 of FIG. 15.

FIG. 16 schematically depicts security circuitry 1600 that can be used as security circuitry 1505 of FIG. 15. Security circuitry 1600 includes two linear-feedback shift registers (LFSRs) 1605 and 1610, the outputs from which are combined by some non-linear masking function represented by a block 1615. LFSRs are deterministic, in the sense that when clocked repeatedly they step through a predictable sequence of states. Consequently, an LFSR that starts with a known key value will contain a predictable pad value after a given number of clock periods. LFSRs can be reverse engineered given a fragment of the sequence they generate. The inclusion of the non-linear function of block 1615 makes this considerably more difficult. Examples of suitable non-linear functions and supporting circuits are detailed below.

LFSR 1605 is a parallel, 93-tap implementation that cycles through $2^{93-1}$ values before repeating. LFSR 1610, also parallel, is a 127-tap implementation that cycles through $2^{127-1}$ values. In comparison with more common serial LFSR implementations, parallel LFSRs require a smaller number of taps for a given bit length. Further, parallel implementations advance a fixed number of serial cycles for each parallel cycle, which greatly reduces the similarity of temporally adjacent pad values and thus increases the difficulty of reverse engineering the LFSR logic. Block 1615 combines ninety bits from each of LFSRs 1605 and 1610 using a non-linear function to produce ninety-bit pad values PAD[2:91]. All or a subset of these bits can be used to encrypt or decrypt information as detailed in connection with earlier figures.

A circuit 1625[$i$] at the lower left of FIG. 16 illustrates one of ninety slices 1625 [91:2] of masking function 1615 in accordance with one embodiment. Slice 1625[$i$] includes a full adder FADD and a register C to store a carry bit. Each slice combines a bit from LFSR 1605 with one from LFSR 1610 to produce one bit PAD[i] of pad value PAD[2:91].

Figure 17:
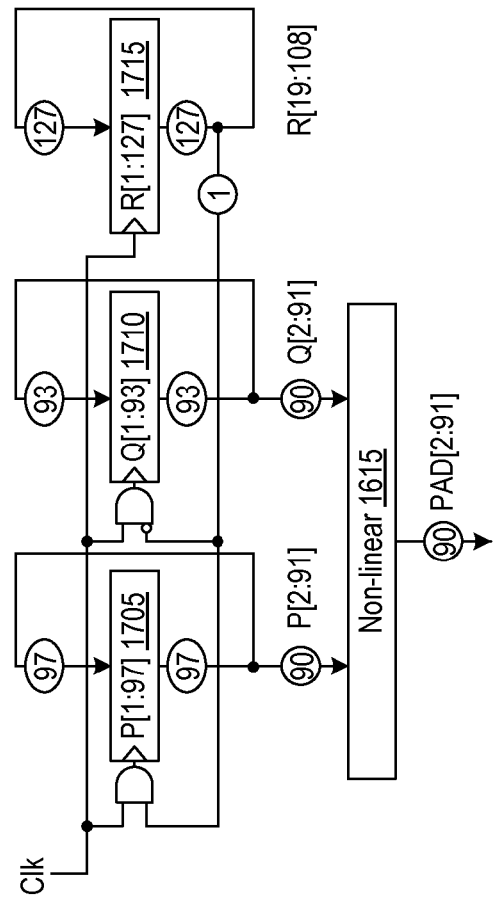
FIG. 17 depicts a non-linear pad-value generator 1700 in accordance with another embodiment.

FIG. 17 depicts a non-linear pad-value generator 1700 in accordance with another embodiment. Generator 1700 includes three LFSRs 1705, 1710, and 1715. A non-linear circuit, block 1615 of FIG. 16 in this embodiment, combines ninety bits from LFSR 1705 with ninety bits from LFSR 1710 to produce ninety-bit pad values PAD[2:91]. A single bit from the third LFSR 1715 pseudo-randomly gates the clock signal to LFSRs 1705 and 1710 to make the pad-value sequence more erratic. The three LFSRs have different jump and repetition rates. LFSR 1715 is a serial LFSR in this embodiment, a bit from which is used to selectively enable the remaining LFSRs.

Figure 18:
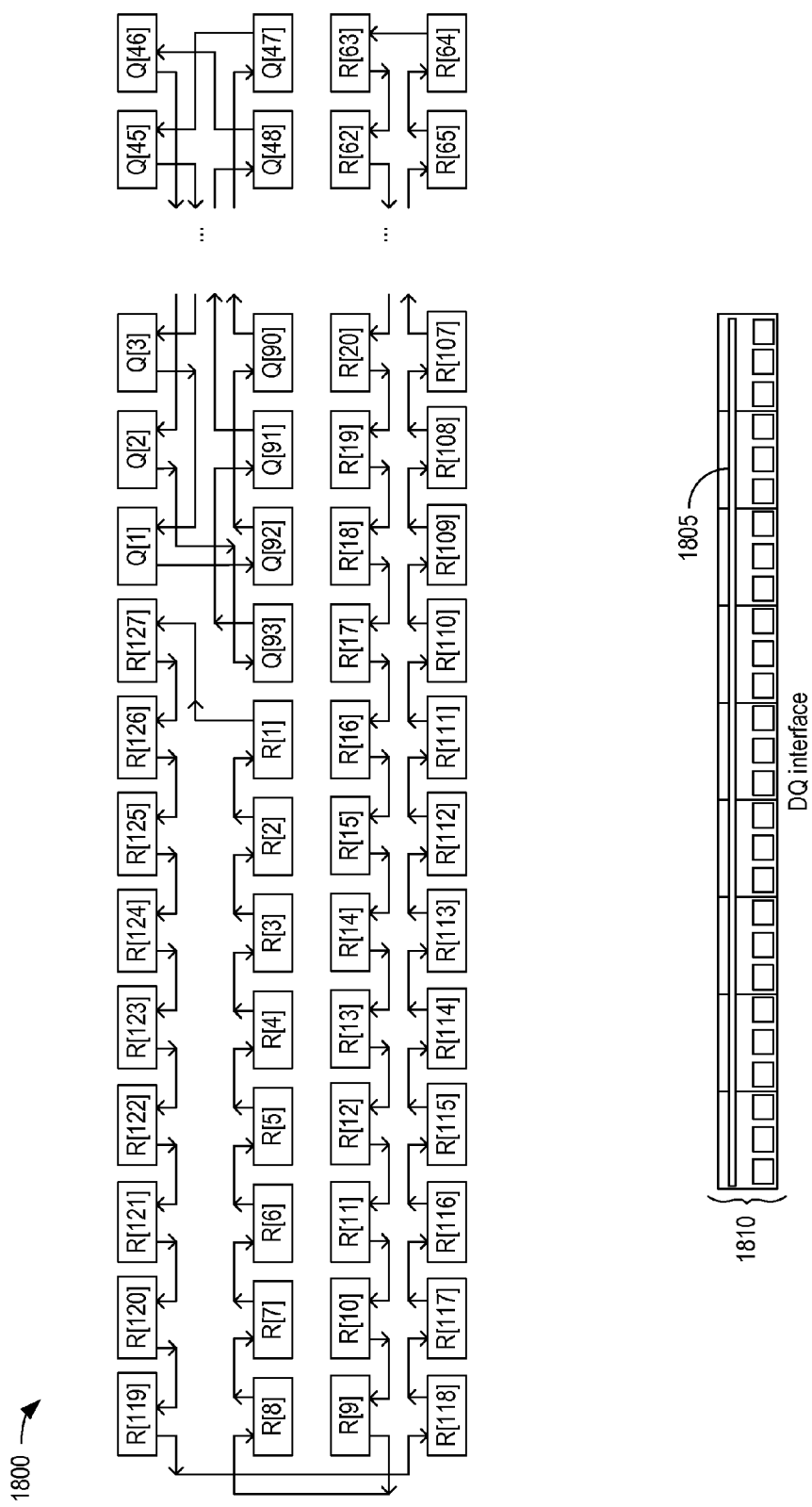
FIG. 18 illustrates how a security circuit 1800 similar to pad-value generator 1700 of FIG. 17 can be physically instantiated as a stripe 1805 within a physical interface 1810 in the manner outlined previously in connection with FIG. 15.

FIG. 18 illustrates how a security circuit 1800 similar to pad-value generator 1700 of FIG. 17 can be physically instantiated as a security stripe 1805 within a physical interface 1810 in the manner outlined previously in connection with FIG. 15. Each block indicated by a "Q" or an "R" represents the sequential and combinatorial logic associated with one bit of a parallel LFSR. Block R[1], for example, provides an exclusive OR of its contents and that from block R[2] as input to block R[127]. The interconnections between the block illustrate the interconnectivity provided by horizontal and vertical wire tracks of an integrated memory die upon which is instantiated generator 1700 of FIG. 17. The LFSRs are specified with jump lengths selected for reduced routing.

Figure 19:
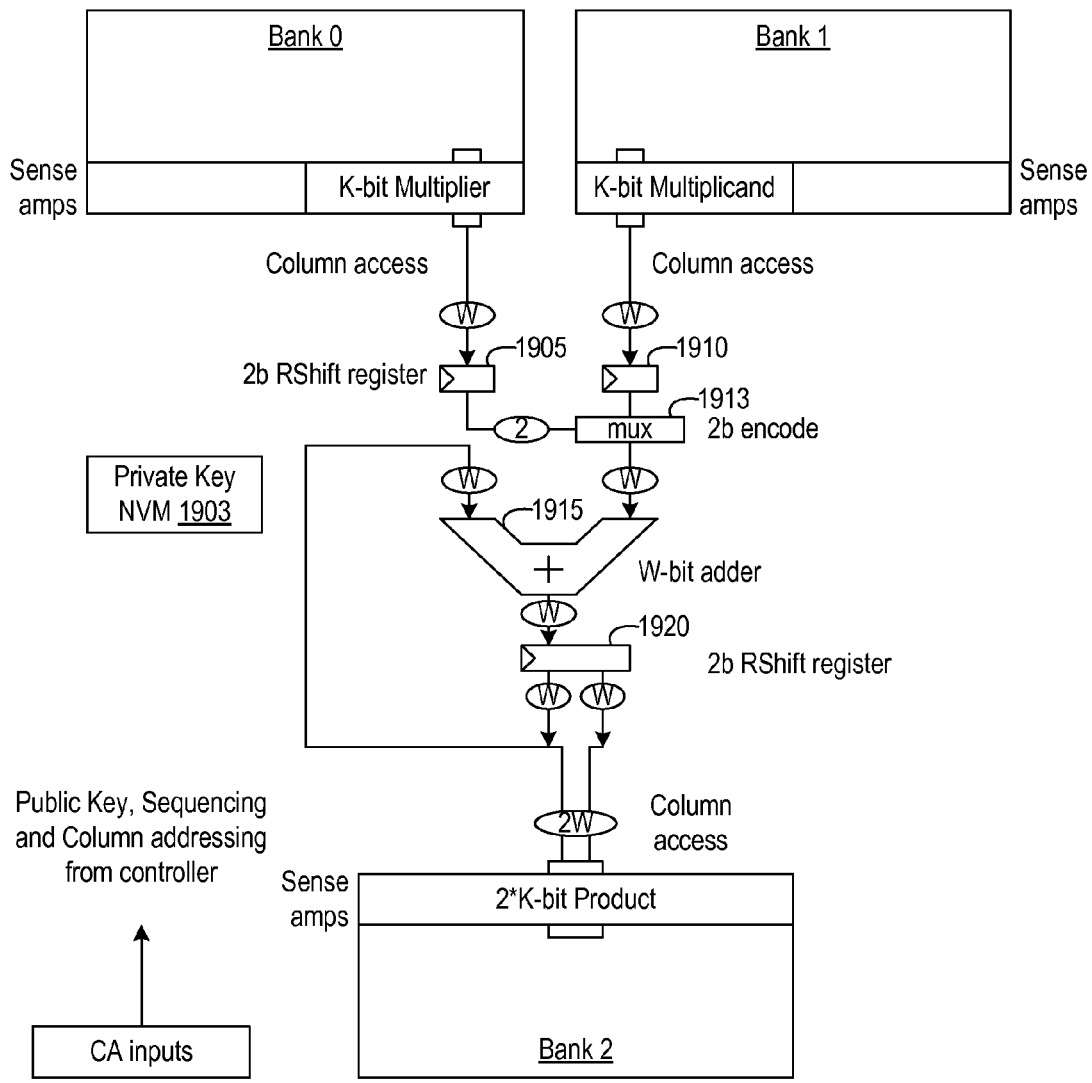
FIG. 19 depicts a memory die 1900 in accordance with an embodiment that supports a multi-modal security circuit.

FIG. 19 depicts a memory die 1900 in accordance with an embodiment that supports a multi-modal security circuit. In one mode, the security circuit issues a sequence of pad values as detailed previously. In another mode, much of the resources employed to generate the pad values are employed to calculate the key value used to seed pad-value generation.

Die 1900 uses an asymmetric key algorithm, such as RSA, to share a starting pad value with an associated controller. Calculating the starting pad value involves finding the product of a public and a private key, both of which can be large numbers. Binary keys of 512 or 1024 bits are common. The process of calculating the product of large numbers can be broken down into a sequence of multiply-accumulate operations and act on subsets of the bits of the larger numbers. Hardware that performs these operations, commonly referred to as a multiplier-accumulator (MAC, or MAC unit), are well known to those of skill in the art; a detailed discussion is therefore omitted.

Die 1900 is configured to include a MAC for calculating an initial pad value from a shared key, conveyed from the memory controller, and a private key stored in non-volatile memory 1903 (e.g., antifuse- or fuse-based storage elements, or a laser-programmed storage elements). Die 1900 also includes DRAM memory banks Bank[2.0], each of which supports a row of sense amplifiers for reading from and writing to memory. During the key-exchange process, the sense amplifiers are used as scratch registers to store mathematical variables, e.g., a K-bit multiplier, a K-bit multiplicand, and a 2*K-bit product, where K is 1,024 in one embodiment. The multiplier and multiplicand are respectively conveyed to a shift registers 1905 and a register 1910 as W-bit partial products. These registers are made up of the same sequential storage elements used to instantiate the shift registers used for pad-value generation, which are positioned conveniently adjacent the sense amplifiers as illustrated in FIGS. 16 and 18.

The partial products from registers 1905 and 1910 are encoded using a multiplexer 1913 and the results conveyed to a W-bit adder 1915, which produces a sum for storage in another shift register 1920. Partial products from register 1925 are conveyed to the sense amplifiers of memory bank 2, and to a second input of adder 1915 in support of the accumulate function. Adder 1915 is assembled from all or a subset of the full adders FADD used in to produce the non-linear function of the pad generators, and register 1920 is made up of the same sequential storage elements used to instantiate the shift registers used for pad-value generation.

The ability to switch between key-sharing and pad-generation configurations is supported by relatively simple configurable switches that alter the connectivity between the depicted elements to establish a desired configuration. The configuration may be selected at initialization, for example by loading a register on die 1900. When configured as depicted in FIG. 19, the key-sharing algorithm can be directed by the memory controller via a command inputs, or by a controller (not shown) instantiated on die 1900 or elsewhere.

Figure 20:
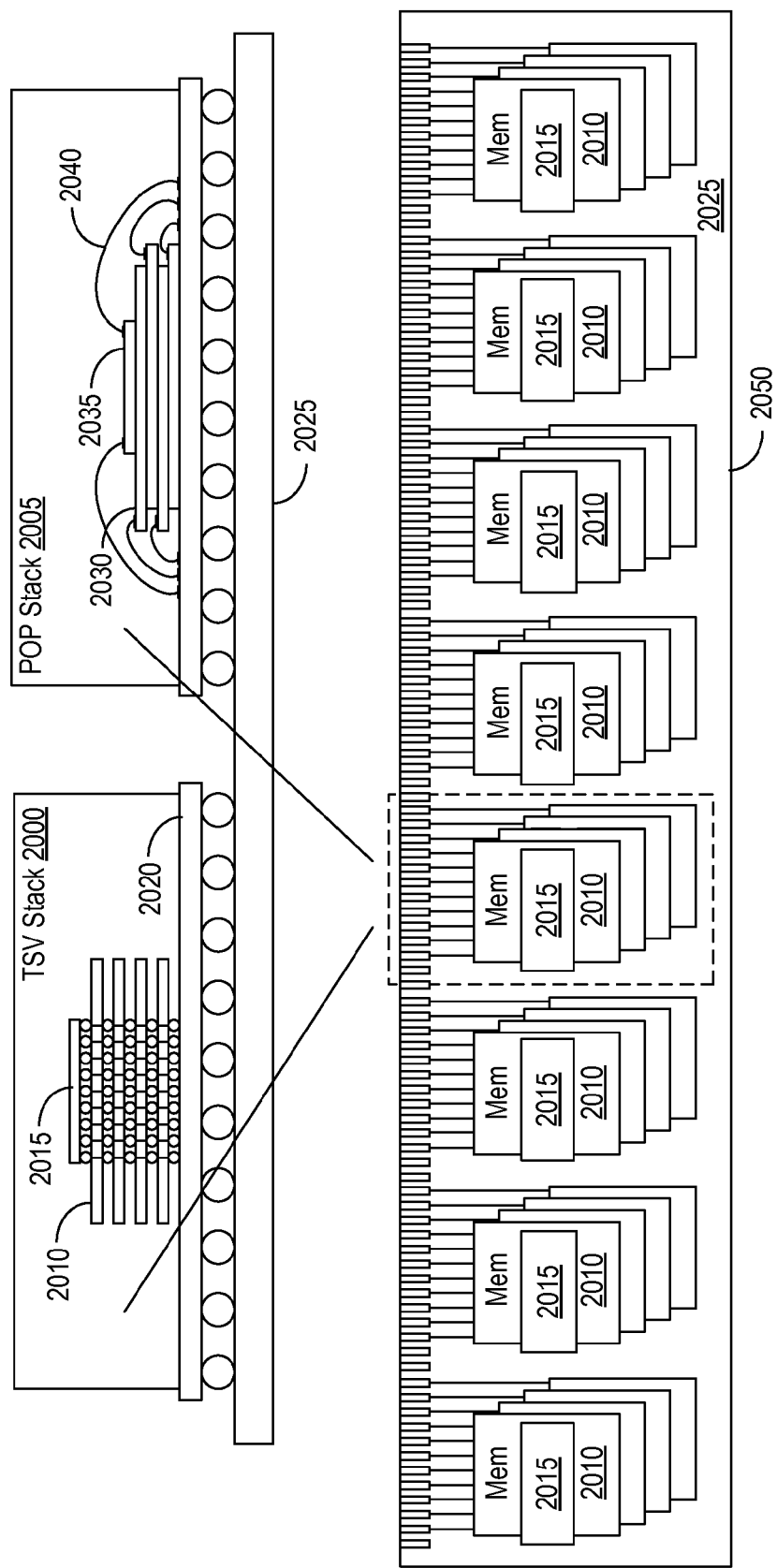
FIG. 20 includes cut-away views of a through-silicon-via (TSV) package 2000 and a package-on-package (POP) 2005, both of which are memories that include cryptography circuitry of the type detailed previously.

FIG. 20 includes cut-away views of a through-silicon-via (TSV) package 2000 and a package-on-package (POP) 2005, both of which are memories that include cryptography circuitry of the type detailed previously. Package 2000 includes stacked memory dies 2010 and a cryptography die 2015 interconnected by vias, and the resultant stack is mounted to a package substrate 2020 that provides external connections to a printed-circuit (PC) board 2025. Package 2005 likewise includes stacked memory dies 2030 and a cryptography die 2035, but these are interconnected by bonding wires 2040. As depicted in plan view at the bottom of FIG. 20, collections of packages 2000 and/or 2005 and the associated PC board 2025 can form a memory module 2050. As used herein, the term "memory" can apply to a memory module, a multi-chip package, or a memory die.

Figure 21:
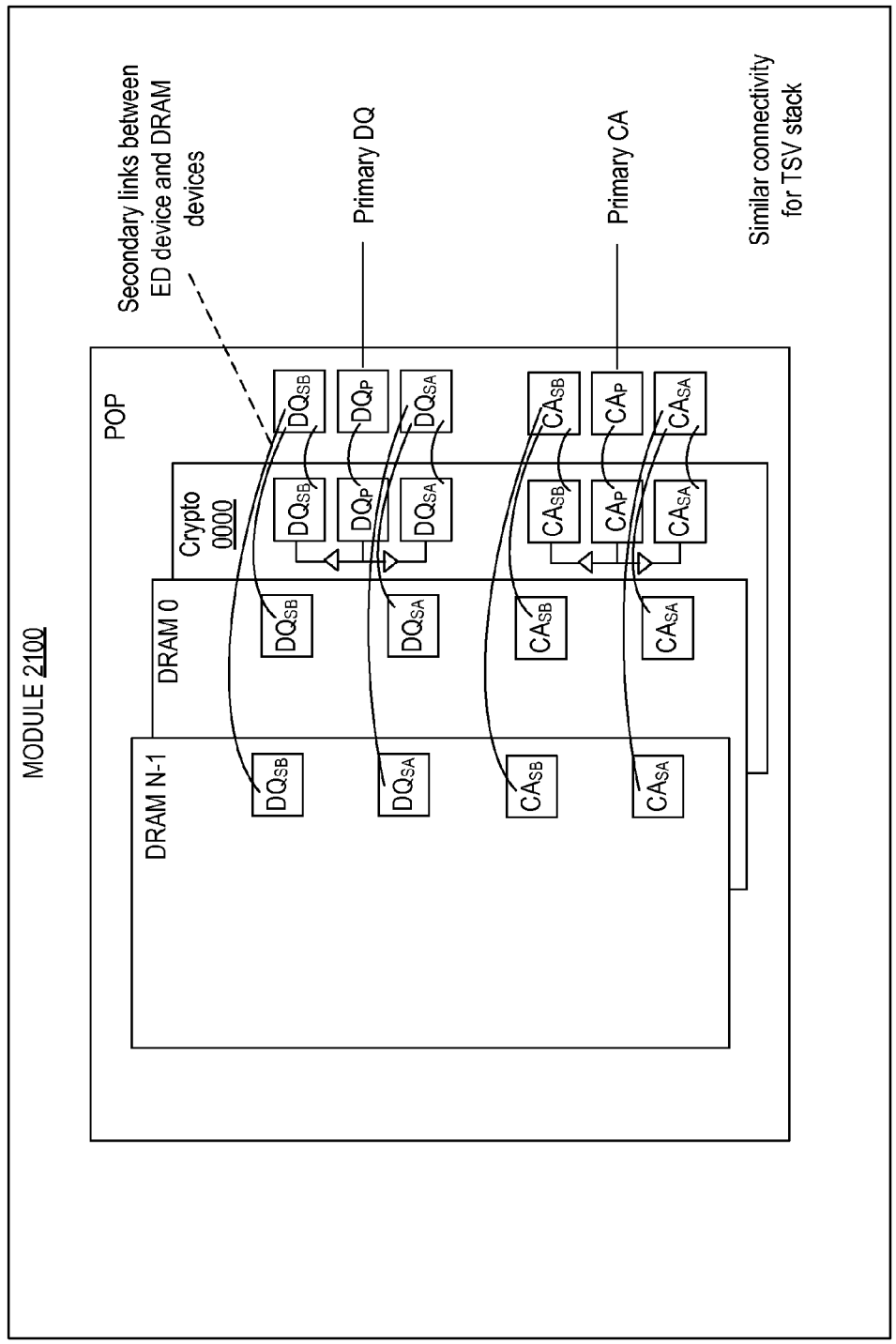
FIG. 21 depicts a memory module 2100 in accordance with another embodiment.

FIG. 21 depicts a memory module 2100 in accordance with another embodiment. In this embodiment primary data (DQ) and command (CA) links are deserialized (e.g., 2:1) before being repeated on secondary links to DRAM [N−1:0]. A cryptographic circuit 2105 can be included in the secondary link. Deserialization is commonly done to ease the timing on the secondary link, but is not necessary. The secondary wire bonds can be routed to a physical pad on the POP substrate between cryptographic circuit 2105 and DRAM component(s).

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. A signal driving circuit is said to "output" a signal to a signal receiving circuit when the signal driving circuit asserts (or de-asserts, if explicitly stated or indicated by context) the signal on a signal line coupled between the signal driving and signal receiving circuits.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the present invention has been described in connection with specific embodiments, variations of these embodiments will be obvious to those of ordinary skill in the art. Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A memory system comprising:
    a memory controller to issue write data, the memory controller including:
        a first link-pad generator to issue a sequence of first pad values of a first pad width; and
        a first cipher circuit connected to the first link-pad generator, the first cipher circuit to combine the write data with the first pad values to produce ciphertext of the first pad width;

data links extending from the memory controller to convey the ciphertext; and a memory device coupled to the memory controller via a subset of the data links to receive a subset of the ciphertext, the memory device including:
  a second link-pad generator to issue a sequence of second pad values of a second pad width, the second link-pad generator including a width-selection port to control the second pad width; and
  a second cipher circuit connected to the second link-pad generator, the second cipher circuit to combine the subset of the ciphertext with the second pad values to recover a subset of the write data.

2. The memory system of claim 1, the first link-pad generator including a second width-selection port to control the first pad width.

3. The memory system of claim 1, wherein the memory controller supports N data channels to a maximum of N memory devices, including the memory device, the memory controller including N first link-pad generators, one first-link-pad generator for each of the N memory devices.

4. The memory system of claim 3, further comprising M memory devices, where M is less than N, and wherein the memory controller disables N minus M of the first link-pad generators.

5. The memory controller of claim 4, further comprising a width-selection register to control the first pad width.

6. The memory system of claim 1, wherein the second link-pad generator derives the sequence of second pad values from a sequence of wider pad values.

7. The memory system of claim 1, further comprising a width-selection register coupled to the width-selection port to control a width of the second pad values.

* * * * *